United States Patent
Kigure

(10) Patent No.: US 12,436,168 B2
(45) Date of Patent: Oct. 7, 2025

(54) PHYSICAL QUANTITY SENSOR AND INERTIAL MEASUREMENT UNIT

(71) Applicant: SEIKO EPSON CORPORATION, Tokyo (JP)

(72) Inventor: Shota Kigure, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 247 days.

(21) Appl. No.: 18/191,131

(22) Filed: Mar. 28, 2023

(65) Prior Publication Data
US 2023/0314465 A1    Oct. 5, 2023

(30) Foreign Application Priority Data
Mar. 29, 2022    (JP) ................................. 2022-053524

(51) Int. Cl.
*G01P 15/125*    (2006.01)
*G01P 15/08*    (2006.01)

(52) U.S. Cl.
CPC .... *G01P 15/125* (2013.01); *G01P 2015/0831* (2013.01)

(58) Field of Classification Search
CPC ................................................... G01P 15/125
USPC ...................................................... 73/514.32
See application file for complete search history.

(56) References Cited

U.S. PATENT DOCUMENTS

| | | |
|---|---|---|
| 2008/0173959 A1 | 7/2008 | Merassi et al. |
| 2011/0291644 A1 | 12/2011 | Kanemoto |
| 2012/0186347 A1* | 7/2012 | McNeil ................. G01P 15/125 |
| | | 73/514.32 |
| 2013/0192371 A1 | 8/2013 | Rytkonen et al. |
| 2014/0069190 A1 | 3/2014 | Tanaka |
| 2014/0251011 A1 | 9/2014 | Zhang et al. |
| 2016/0041198 A1 | 2/2016 | Tanaka |
| 2016/0083249 A1* | 3/2016 | Geisberger ............. H10N 30/30 |
| | | 438/52 |
| 2016/0195567 A1* | 7/2016 | Tanaka ................ G01P 15/0802 |
| | | 73/514.32 |

(Continued)

FOREIGN PATENT DOCUMENTS

| | | |
|---|---|---|
| JP | 2008-292451 A | 12/2008 |
| JP | 2011-247812 A | 12/2011 |

(Continued)

OTHER PUBLICATIONS

Yonemura et al. Machine Translation of WO-2014092059-A1. Published Jun. 2014. Axxessed Jan. 2025. (Year: 2014).*

*Primary Examiner* — Walter L Lindsay, Jr.
*Assistant Examiner* — Philip T Fadul
(74) *Attorney, Agent, or Firm* — Harness, Dickey & Pierce, P.L.C.

(57) ABSTRACT

A physical quantity sensor includes: a substrate; a first anchor; a second anchor; a first support beam; a second support beam; a first movable body; a second movable body; and a shielder. A first fixed electrode and a second fixed electrode are provided on the substrate. The first movable body is provided to be swingable with respect to the substrate about a first rotation axis along a second direction. The second movable body is provided to be swingable with respect to the substrate about a second rotation axis along the second direction. The shielder is provided between the first movable body and the second movable body along a first direction.

12 Claims, 17 Drawing Sheets

(56) References Cited

U.S. PATENT DOCUMENTS

2022/0390483 A1\* 12/2022 Zhang .................. G01P 15/125

FOREIGN PATENT DOCUMENTS

| JP | 2012-154919 A | 8/2012 | |
|---|---|---|---|
| JP | 2013-217794 A | 10/2013 | |
| JP | 2014-174165 A | 9/2014 | |
| JP | 2015-031645 A | 2/2015 | |
| JP | 2015-503758 A | 2/2015 | |
| WO | WO-2014092059 A1 \* | 6/2014 | ......... G01C 19/5726 |

\* cited by examiner

FIRST DRIVE SIGNAL DS1 (SINE WAVE)

SECOND DRIVE SIGNAL DS2
(SINE WAVE WHOSE PHASE IS SHIFTED BY 180°)

PHYSICAL QUANTITY SENSOR AND INERTIAL MEASUREMENT UNIT

The present application is based on, and claims priority from JP Application Serial Number 2022-053524, filed Mar. 29, 2022, the disclosure of which is hereby incorporated by reference herein in its entirety.

BACKGROUND

1. Technical Field

The present disclosure relates to a physical quantity sensor, an inertial measurement unit, and the like.

2. Related Art

JP-A-2012-154919 discloses an acceleration sensor including a substrate, a suspension anchor formed on a planar surface of the substrate, a first movable element, and a second movable element. The first movable element and the second movable element of the acceleration sensor have the same shape, and are rotationally symmetrically oriented on the substrate.

In the acceleration sensor disclosed in JP-A-2012-154919, the two lower electrodes are separate electrodes. For this reason, in order to make fluctuations in capacitance generated when the two movable elements move to coincide with each other, it is necessary to make potentials of the two movable elements different from each other. As described above, when different potentials are applied to the two movable elements to detect the acceleration, an electrostatic attractive force is generated between the two movable elements, and the electrostatic attractive force may deteriorate detection sensitivity of the acceleration sensor.

SUMMARY

An aspect of the present disclosure relates to a physical quantity sensor for detecting, when directions orthogonal to one another being defined as a first direction, a second direction, and a third direction, a substrate; a first fixed electrode and a second fixed electrode provided on a surface of the substrate which is orthogonal to the third direction and along the first direction and the second direction, the first fixed electrode and the second fixed electrode being arranged along the first direction; a first movable body provided to be swingable with respect to the substrate about a first rotation axis along the second direction, the first movable body facing the first fixed electrode and the second fixed electrode; and a second movable body provided to be swingable with respect to the substrate about a second rotation axis along the second direction, the second movable body facing the first fixed electrode and the second fixed electrode, wherein in a plan view from the third direction, the first rotation axis is disposed between the first fixed electrode and the second fixed electrode, the second rotation axis is disposed between the first fixed electrode and the second fixed electrode, and a shielder is provided between the first movable body and the second movable body along the first direction.

Another aspect of the present disclosure relates to an inertial measurement unit including the physical quantity sensor described above and a controller configured to perform control based on a detection signal output from the physical quantity sensor.

DESCRIPTION OF EXEMPLARY EMBODIMENTS

Hereinafter, an embodiment will be described. The embodiment to be described below does not unduly limit contents described in the claims. All configurations described in the embodiment are not necessarily essential constituent elements.

1. Physical Quantity Sensor

Figure 1:
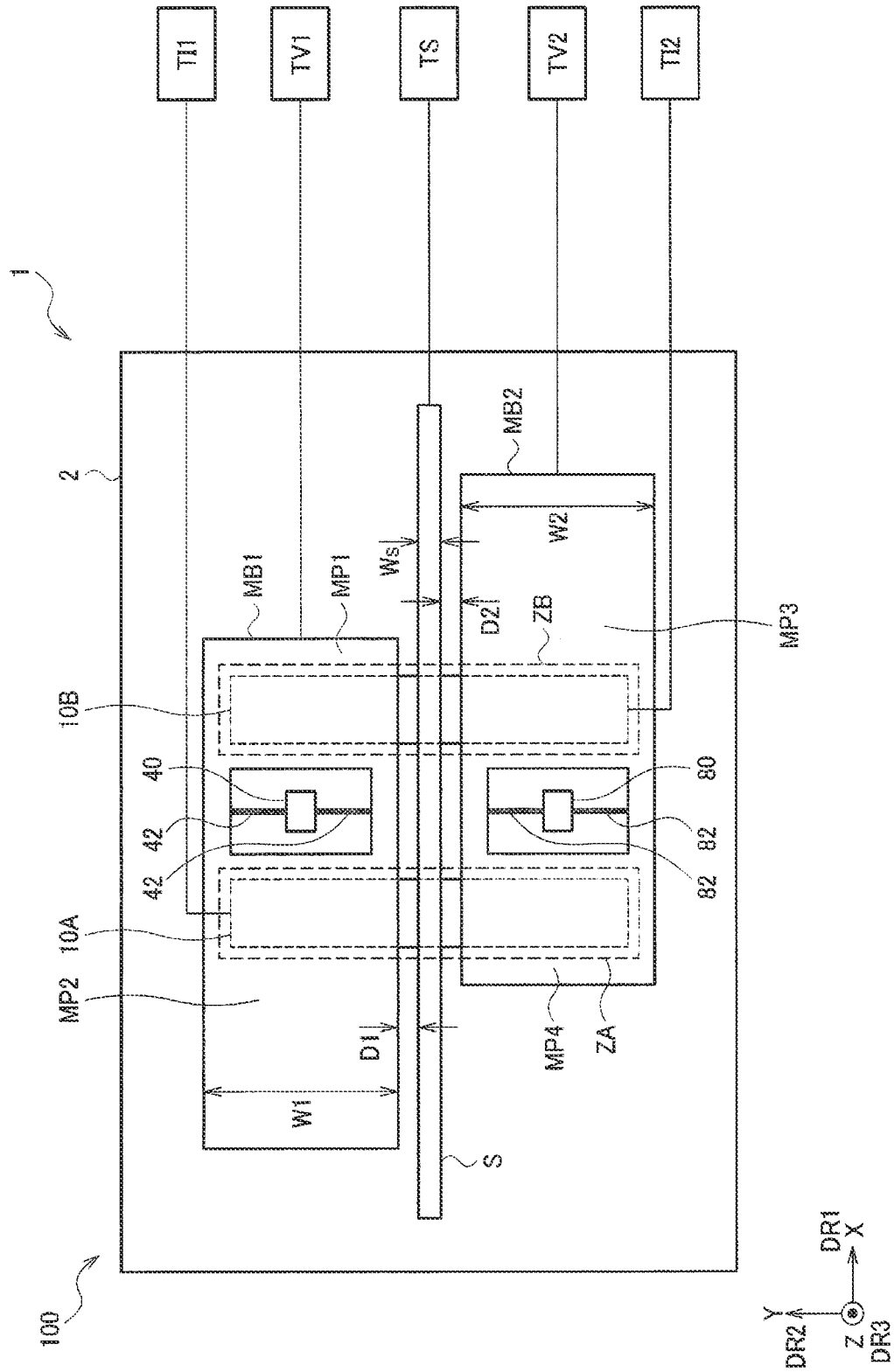
FIG. 1 is a plan view of a first configuration example of a physical quantity sensor according to an embodiment.

A physical quantity sensor 1 according to the embodiment will be described with reference to FIG. 1 by taking an acceleration sensor that detects an acceleration in a vertical direction as an example. FIG. 1 is a plan view of a first configuration example of the physical quantity sensor 1 in a direction orthogonal to a substrate 2. The physical quantity sensor 1 is a micro electro mechanical systems (MEMS) device, and is, for example, an inertial sensor.

In FIG. 1 and FIGS. 2 to 5, 9, 10, and 13 to 18 which will be described later, for convenience of description, dimensions of members, intervals between the members, and the like are schematically shown, and not all the constituent elements are shown. For example, an electrode wiring, an electrode terminal, and the like are omitted as appropriate. In the following description, a case where a physical quantity detected by the physical quantity sensor 1 is an acceleration will be mainly described as an example. The physical quantity is not limited to the acceleration, and may be other physical quantities such as a velocity, pressure, displacement, an angular velocity, or gravity. The physical quantity sensor 1 may be used as a pressure sensor, a MEMS switch, or the like. In FIG. 1, directions orthogonal to one another are referred to as a first direction DR1, a second direction DR2, and a third direction DR3. The first direction DR1, the second direction DR2, and the third direction DR3 are, for example, an X-axis direction, a Y-axis direction, and a Z-axis direction, respectively, and are not limited thereto. The third direction DR3 corresponding to the Z-axis direction is, for example, a direction orthogonal to the substrate 2 of the physical quantity sensor 1, and is, for example, a vertical direction. A fourth direction DR4 shown in FIG. 5 and the like is a direction opposite to the third direction DR3, and is, for example, a direction on a negative side of a Z axis. The first direction DR1 corresponding to the X-axis direction and the second direction DR2 corresponding to the Y-axis direction are directions orthogonal to the third direction DR3. An XY plane which is a plane along the first direction DR1 and the second direction DR2 is, for example, along a horizontal plane. The term "orthogonal" includes not only a case of crossing at 90° but also a case of crossing at an angle slightly inclined from 90°.

The substrate 2 is, for example, a silicon substrate made of semiconductor silicon or a glass substrate made of a glass material such as borosilicate glass. However, a constituent material of the substrate 2 is not particularly limited, and a quartz substrate, a silicon on insulator (SOI) substrate, or the like may be used.

As shown in FIG. 1, the physical quantity sensor 1 according to the embodiment includes a first fixed electrode 10A, a second fixed electrode 10B, a first movable body MB1, a second movable body MB2, anchors 40 and 80 (a first anchor 40 and a second anchor 80), support beams 42 and 82 (a first support beam 42 and a second support beam 82), and a shielder S. Further, the first movable body MB1 includes a first mass part MP1 and a second mass part MP2, and the second movable body MB2 includes a third mass part MP3 and a fourth mass part MP4. The first fixed electrode 10A, the second fixed electrode 10B, the first movable body MB1, the second movable body MB2, the anchors 40 and 80, the support beams 42 and 82, and the shielder S constitute a detection element 100 of the physical quantity sensor 1. The detection element 100 detects a physical quantity in the third direction DR3, which is the Z-axis direction, in a detector ZA and a detector ZB.

Figure 2:
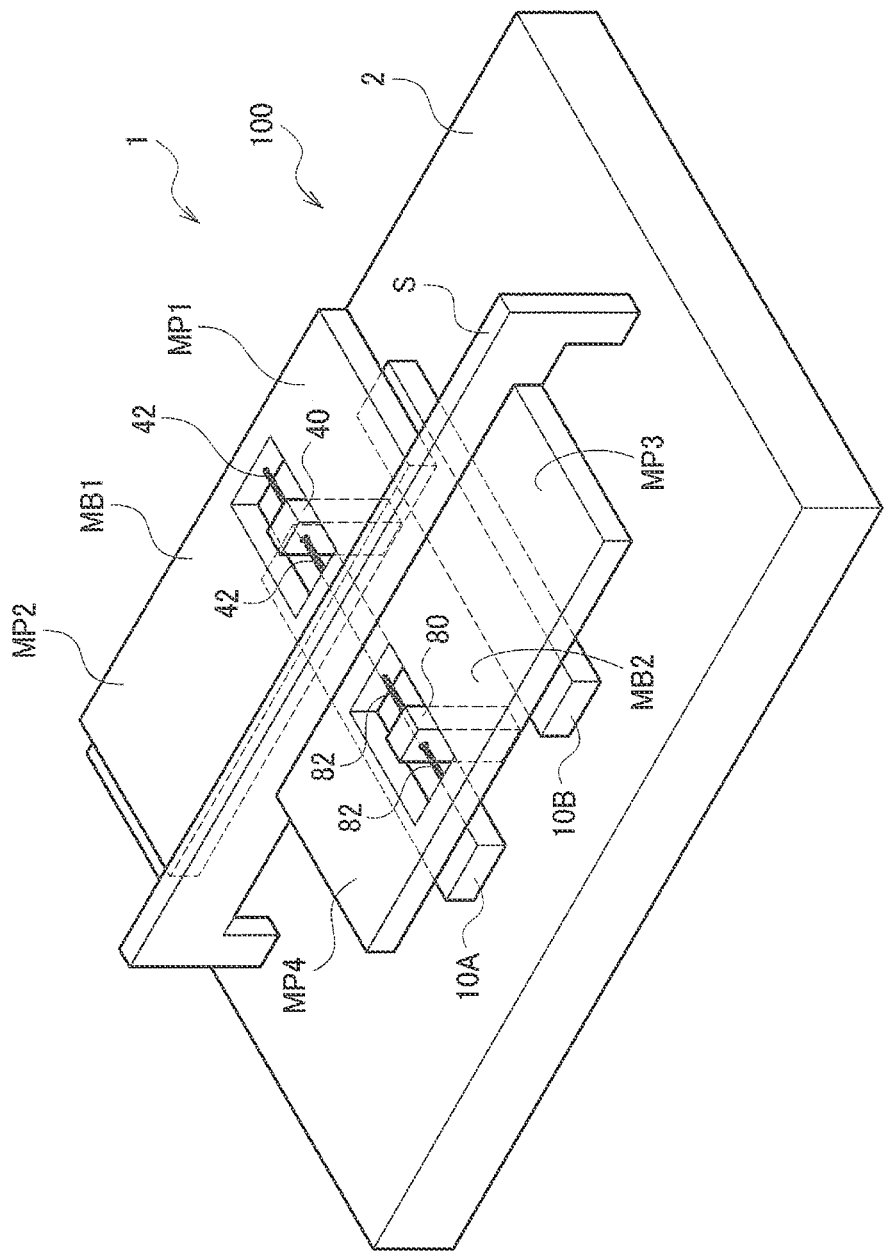
FIG. 2 is a perspective view of the first configuration example of the physical quantity sensor according to the embodiment.

The first fixed electrode 10A is a probe electrode of the detector ZA and is a detection electrode. The first fixed electrode 10A has, for example, a rectangular shape having a long side in a direction along the second direction DR2 in a plan view. FIG. 2 is a perspective view of a first configuration example shown in FIG. 1. FIG. 2 is a schematic perspective view of the first configuration example, and there is a portion different from an actual structure. For example, in practice, walls of the detection element 100 are formed to surround four sides thereof, and the detection element 100 is disposed in a recess surrounded by the four side walls. The shielder S is formed integrally with the walls, for example. As shown in FIG. 2, the first fixed electrode 10A is provided on a −Z direction side of the first movable body MB1, the second movable body MB2, and the shielder S. Therefore, in FIG. 1, a visible part of the first fixed electrode 10A is indicated by a solid line, and a part hidden by the first movable body MB1, the second movable body MB2, and the shielder S is indicated by a broken line. As shown in FIG. 2, the first fixed electrode 10A faces the second mass part MP2 of the first movable body MB1 in the third direction DR3 in a region where the first movable body MB1 is provided. The first fixed electrode 10A faces the fourth mass part MP4 of the second movable body MB2 in the third direction DR3 in a region where the second movable body MB2 is provided.

The second fixed electrode 10B is a probe electrode of the detector ZB and is a detection electrode. Similarly to the first fixed electrode 10A, the second fixed electrode 10B also has a rectangular shape having a long side in a direction along the second direction DR2 in a plan view, and is provided on the −Z direction side of the first movable body MB1, the second movable body MB2, and the shielder S. Further, in a plan view, the second fixed electrode 10B is provided across the first movable body MB1, the second movable body and the shielder S. The second fixed electrode 10B faces the first mass part MP1 of the first movable body MB1 in the third direction DR3 in the region where the first movable body MB1 is provided. The second fixed electrode 10B faces the third mass part MP3 of the second movable body MB2 in the third direction DR3 in the region where the second movable body MB2 is provided.

The anchor 40 is fixed by coupling one end of the support beam 42 to the substrate 2. The anchor 80 is fixed by coupling one end of the support beam 82 to the substrate 2. The anchors 40 and 80 are provided on the substrate 2. As shown in FIG. 2, the anchors 40 and 80 each have, for example, a columnar shape extending from the substrate 2 in the third direction DR3. Further, the anchors 40 and 80 are arranged side by side in the second direction DR2 in a plan view. As shown in FIG. 2, the anchor 40 is coupled to one end of the support beam 42 in the vicinity of a tip of an extending column of the anchor 40, and the anchor 80 is also coupled to one end of the support beam 82 in the vicinity of a tip of an extending column of the anchor 80.

The support beams 42 and 82 are, for example, twisting springs. As shown in FIG. 1, the support beams 42 and 82 have, for example, a thin line shape along the second direction DR2 in a plan view, and can be twisted around an axis in the second direction DR2. As described above, one end of the support beam 42 is coupled to the anchor 40. Of ends of the support beam 42, the other end thereof, which is not coupled to the anchor 40, is coupled to the first movable body MB1. Specifically, as shown in FIG. 2, an opening is provided in a part of the first movable body MB1, and the anchor 40 and the first movable body MB1 are coupled to each other via the support beam 42 in the opening. Similarly to the support beam 42, of ends of the support beam 82, the other end of the support beam 82, which is not coupled to the anchor 80, is coupled to the second movable body MB2 in an opening provided in the second movable body MB2. In this way, the support beams 42 and 82 couple the first movable body MB1 and the second movable body MB2 to the anchors 40 and 80, respectively. Here, an axis around which the support beam 42 (the first support beam 42) is twisted is referred to as a first rotation axis, and an axis around which the support beam 82 (the second support beam 82) is twisted is referred to as a second rotation axis.

Figure 14:
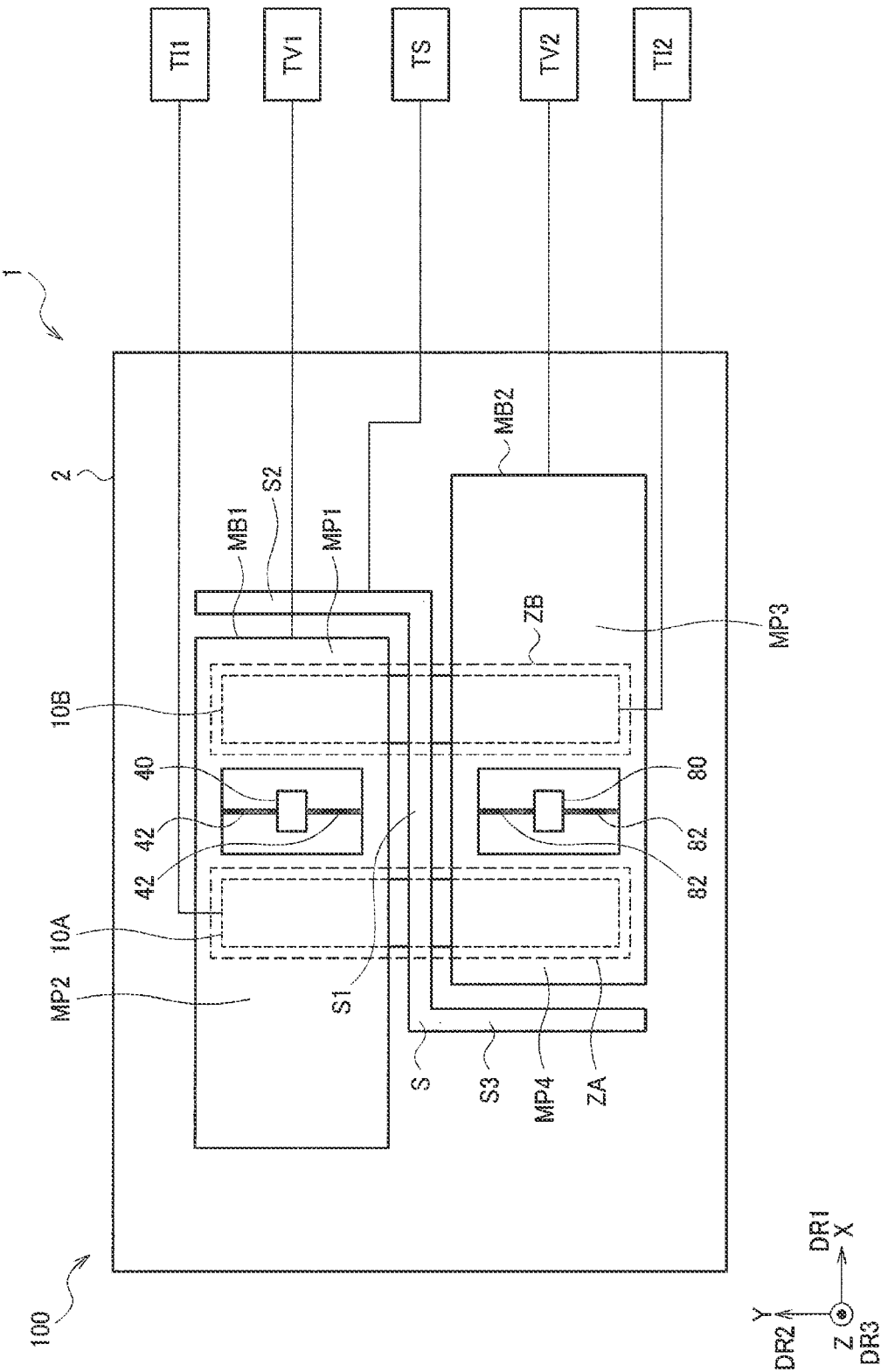
FIG. 14 is a plan view of a second configuration example of the physical quantity sensor according to the embodiment.

In FIGS. 1 and 2 and FIG. 14 to be described later, both the first rotation axis and the second rotation axis are axes along a Y axis, and may be axes other than the Y axis.

The first movable body MB1 performs a swinging motion about the first rotation axis. As shown in FIG. 1, the first mass part MP1 and the second mass part MP2 of the first movable body MB1 are provided on left and right of the first rotation axis along the support beam 42. Specifically, in a plan view, for example, the first mass part MP1 is disposed on a first direction DR1 side from the first rotation axis, and the second mass part MP2 is disposed on an opposite direction side to the first direction DR1 from the first rotation axis. As shown in FIG. 1, the second mass part MP2 is longer in the first direction DR1 than the first mass part MP1. Therefore, a mass of the second mass part MP2 is heavier than a mass of the first mass part MP1. The first mass part MP1 and the second mass part MP2 both serve as a mass part in a rotary motion system around the first rotation axis. Therefore, the first movable body MB1 includes the first mass part MP1 and the second mass part MP2 around the first rotation axis, and is swingable about the first rotation axis. The swing refers to, for example, a displacement such as vibration in a rotation trajectory around a rotation axis.

The first mass part MP1 and the second mass part MP2 also serve as probe electrodes in the detector ZB. That is, the first mass part MP1 and the second fixed electrode 10B facing the first mass part MP1 in the third direction DR3 constitute an electrostatic capacitance capacitor. Further, the second mass part MP2 and the first fixed electrode 10A facing the second mass part MP2 in the third direction DR3 constitute an electrostatic capacitance capacitor. A physical quantity such as an acceleration is detected by detecting electrostatic capacitances obtained by these electrostatic capacitance capacitors.

Similarly to the first movable body MB1, the second movable body MB2 performs the swinging motion about the second rotation axis. The third mass part MP3 and the fourth mass part MP4 of the second movable body MB2 are provided on the left and right of the second rotation axis along the support beam 82, and for example, the third mass part MP3 is disposed on the first direction DR1 side from the second rotation axis, and the fourth mass part MP4 is disposed on the opposite direction side to the first direction DR1 from the first rotation axis. The third mass part MP3 is longer in first direction DR1 than the fourth mass part MP4. A mass of the third mass part MP3 is heavier than a mass of the fourth mass part MP4. The third mass part MP3 and the fourth mass part MP4 both serve as a mass part in a rotary motion system around the second rotation axis. Therefore, the second movable body MB2 includes the third mass part MP3 and the fourth mass part MP4 around the second rotation axis, and is swingable about the second rotation axis.

The third mass part MP3 and the fourth mass part MP4 also serve as the probe electrodes in the detector ZA. That is, the third mass part MP3 and the second fixed electrode 10B facing the third mass part MP3 in the third direction DR3 constitute an electrostatic capacitance capacitor. The fourth mass part MP4 and the first fixed electrode 10A facing the fourth mass part MP4 in the third direction DR3 constitute an electrostatic capacitance capacitor. A physical quantity such as an acceleration is detected by detecting electrostatic capacitances obtained by these electrostatic capacitance capacitors.

As shown in FIG. 1, the detectors ZA and ZB are detectors that form a part of the detection element 100. Specifically, the detector ZA is a region including the second mass part MP2 and the fourth mass part MP4 facing the first fixed electrode 10A. That is, the detector ZA includes a portion facing the second mass part MP2 of the first movable body MB1 and a portion facing the fourth mass part MP4 of the second movable body MB2, using the first fixed electrode 10A as a common fixed electrode. As described above, the second mass part MP2 and the fourth mass part MP4 both face the first fixed electrode 10A, each serving as an electrostatic capacitance capacitor. The detector ZB is a region including the first mass part MP1 and the third mass part MP3 facing the second fixed electrode 10B. That is, the detector ZB includes a portion facing the first mass part MP1 of the first movable body MB1 and a portion facing the third mass part MP3 of the second movable body MB2, using the second fixed electrode 10B as a common fixed electrode. As will be described later with reference to FIG. 8, changes in electric charges in the detectors ZA and ZB are detected by a differential amplifier circuit QV (not shown).

As shown in FIG. 1, the shielder S is provided between the first movable body MB1 and the second movable body MB2 in a plan view, and has, for example, a rectangular shape with a direction along the first direction DR1 as a long-side direction. In practice, as described above, one end of the shielder S is coupled to a first wall on the first direction DR1 side of the detection element 100 among the four walls surrounding the four sides of the detection element 100, and the other end of the shielder S is coupled to a second wall on the opposite direction side to the first direction DR1 of the detection element 100.

Figure 3:
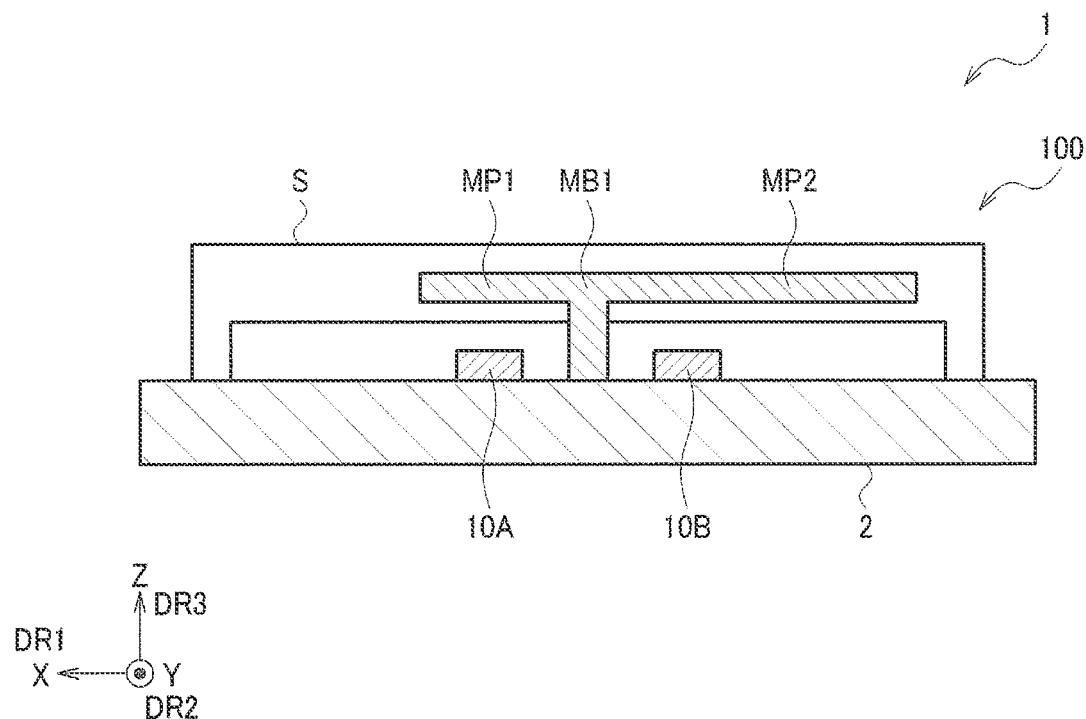
FIG. 3 is a side view of the first configuration example of the physical quantity sensor according to the embodiment.

FIG. 3 is a schematic side view of the physical quantity sensor 1 according to the embodiment as viewed from a +Y direction. As shown in FIG. 3, the shielder S is provided as a wall between the first movable body MB1 and the second movable body MB2. When the physical quantity sensor 1 is viewed from the +Y direction, the second movable body MB2 is hidden and invisible due to the shielder S.

Figure 4:
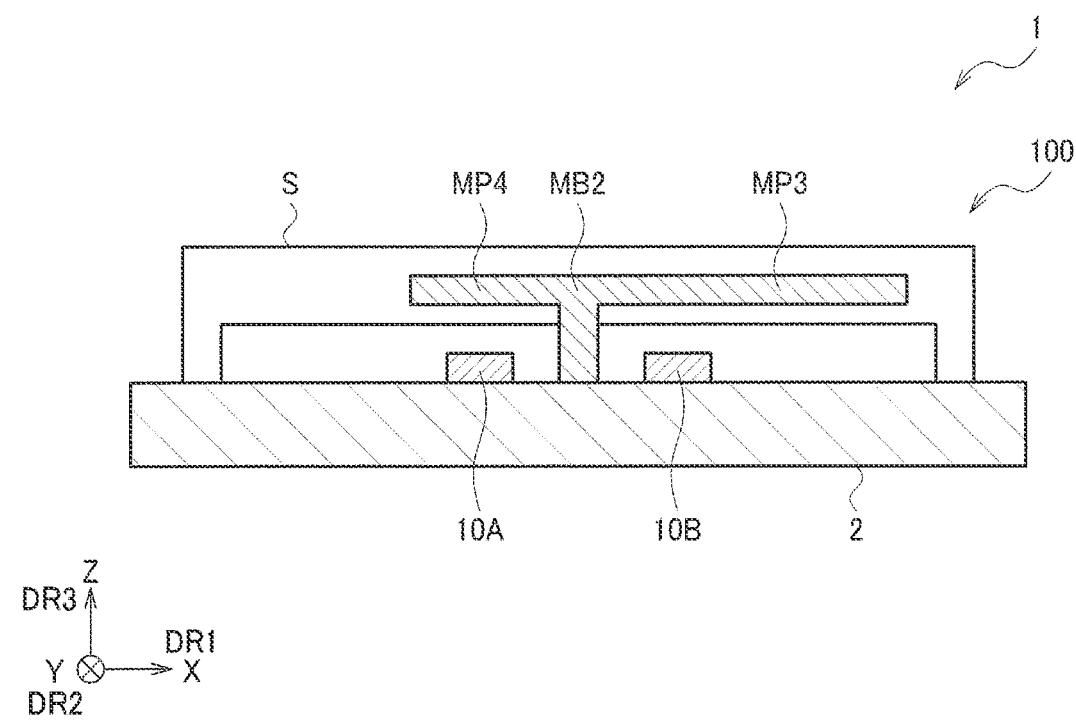
FIG. 4 is a side view of the first configuration example of the physical quantity sensor according to the embodiment.
Figure 17:
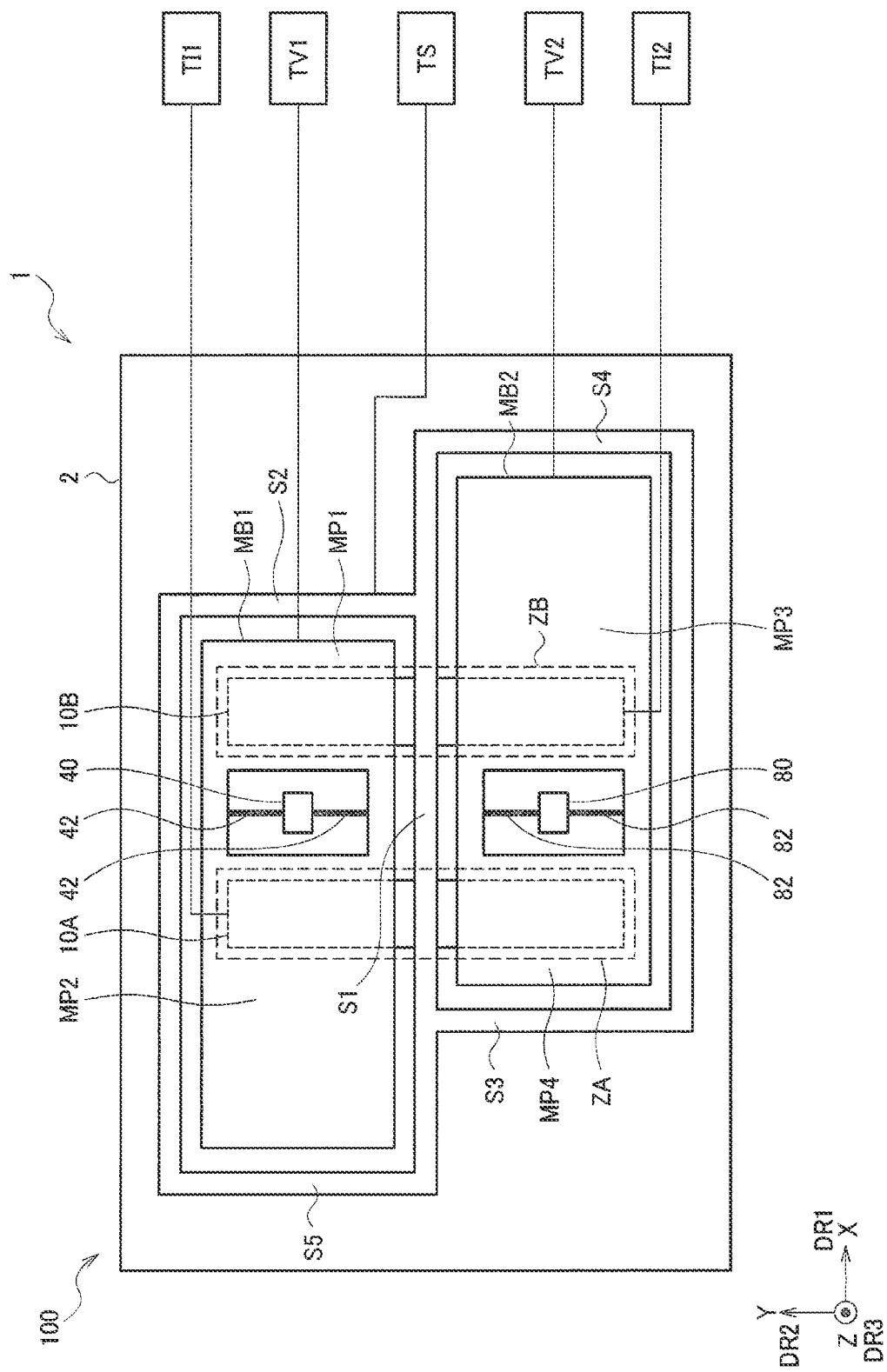
FIG. 17 is a plan view of a third configuration example of the physical quantity sensor according to the embodiment.

The wall is a wall that electrically or magnetically separates the first movable body MB1 from the second movable body MB2, and can take various shapes as a wall that forms in a space separating the first movable body MB1 from the second movable body MB2. Specifically, the shapes can be as shown in FIGS. 14 and 17 described later, and a height in the third direction DR3 and the like is not limited to that shown in FIGS. 3 and 4. For example, the shielder S may have a height substantially the same as the first movable body MB1 and the second movable body MB2, or may be higher than the first movable body MB1 and the second movable body MB2. FIG. 4 is a side view of the physical quantity sensor 1 according to the embodiment as viewed from a −Y direction. As shown in FIG. 4, when viewed from the −Y direction, the first movable body MB1 is hidden and invisible due to the shielder S. As described later with reference to FIG. 11 and the like, the shielder S reduces an electrostatic force generated between the first movable body MB1 and the second movable body MB2.

As shown in FIG. 1, lengths of short sides of the first movable body MB1 and the second movable body MB2 along the second direction DR2 are W1 and W2, respectively. A length of a short side of the shielder S along the second direction DR2 is Ws. The shielder S faces the first movable body MB1 and the second movable body MB2 at distances D1 and D2 in the second direction DR2, respectively.

Figure 5:
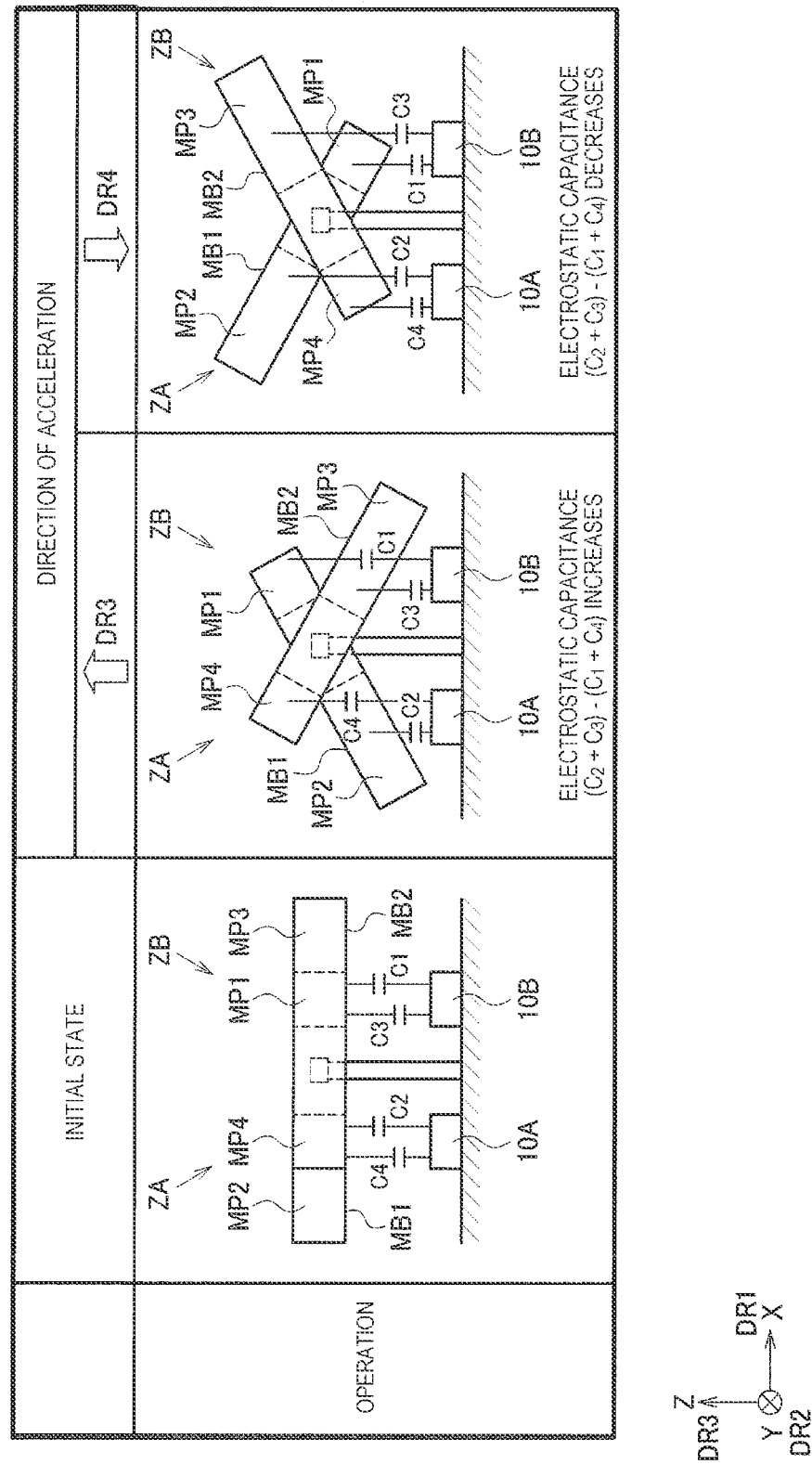
FIG. 5 is an illustrative diagram of an operation of the physical quantity sensor according to the embodiment.

Next, a basic operation of the physical quantity sensor 1 according to the embodiment will be described. FIG. 5 is an illustrative diagram of operations in the detectors ZA and ZB in the detection element 100. FIG. 5 shows cross-sectional views of an XZ plane showing positional relationships between the detectors ZA and ZB in an initial state from the left, when an acceleration in the third direction DR3 is generated, and when an acceleration in the fourth direction DR4 is generated. The initial state is a state in which an acceleration including the gravity is not generated in the third direction DR3.

First, in the initial state, as shown on the left side of FIG. 5, the first mass part MP1 and the second mass part MP2 of the first movable body MB1 are balanced in a horizontal state in a side view in the second direction DR2. Similarly, the third mass part MP3 and the fourth mass part MP4 of the second movable body MB2 are balanced in the horizontal state. Further, when an electrostatic capacitance between the second mass part MP2 and the first fixed electrode 10A is C2 and an electrostatic capacitance between the fourth mass part MP4 and the first fixed electrode 10A is C4, since a distance between the electrodes facing each other in each electrostatic capacitance capacitor is equal, the same electric charge is accumulated in each electrostatic capacitance capacitor in the detector ZA. Also in the detector ZB, when an electrostatic capacitance between the first mass part MP1 and the second fixed electrode 10B is C1 and an electrostatic capacitance between the third mass part MP3 and the second fixed electrode 10B is C3, since a distance between the electrodes in each capacitance capacitor is equal, the same electric charge is accumulated in each electrostatic capacitance capacitor.

Next, a state in which the acceleration in the third direction DR3 is generated will be described. As shown in the center of FIG. 5, when the acceleration is generated in the third direction DR3, in the detector ZA, the second mass part MP2 having a heavier mass receives an inertial force in an opposite direction side to the third direction DR3 and is displaced in a fourth direction DR4 side. On the other hand, in the detector ZB, the third mass part MP3 having a heavier mass receives an inertial force in the fourth direction DR4 in the same manner, and is displaced toward the fourth direction DR4 side. Therefore, in the detector ZA, the electrostatic capacitance C2 on a first movable body MB1 side increases as compared with the initial state because the distance between the electrodes decreases, and the electrostatic capacitance C4 on a second movable body MB2 side decreases as compared with the initial state because the distance between the electrodes increases. Therefore, in the detector ZA, a difference between the electrostatic capacitance C2 and the electrostatic capacitance C4 (C2−C4) is a positive value. In the detector ZB, the electrostatic capacitance C1 on the first movable body MB1 side decreases because the distance between the electrodes increases, and the electrostatic capacitance C3 on the second movable body MB2 side increases because the distance between the electrodes decreases. Therefore, in the detector ZB, a difference between the electrostatic capacitance C1 and the electrostatic capacitance C3 (C3−C1) is also a positive value. Therefore, in the detector ZA and the detector ZB as a whole, (C2+C3)−(C1+C4) is a positive value, and the acceleration in the third direction DR3 is detected as the difference in electrostatic capacitance.

Further, a state in which the acceleration in the fourth direction DR4 is generated will be described. As shown on the right side of FIG. 5, when the acceleration is generated in the fourth direction DR4, in the detector ZA, the second mass part MP2 having a heavier mass receives an inertial force in an opposite direction side to the fourth direction DR4 and is displaced in a third direction DR3 side. On the other hand, in the detector ZB, the third mass part MP3 having a heavier mass receives an inertial force in the third direction DR3 in the same manner, and is displaced in the third direction DR3 side. Therefore, in the detector ZA, the electrostatic capacitance C2 on the first movable body MB1 side decreases because the distance between the electrodes increases, and the electrostatic capacitance C4 on the second movable body MB2 side increases because the distance between the electrodes decreases. Therefore, in the detector ZA, the difference in electrostatic capacitance (C2−C4) is a negative value. In the detector ZB, the electrostatic capacitance C1 on the first movable body MB1 side increases because the distance between the electrodes decreases, and the electrostatic capacitance C3 on the second movable body MB2 side decreases because the distance between the electrodes increases. Therefore, in the detector ZB, the difference in electrostatic capacitance (C3−C1) is also a negative value. Therefore, in the detector ZA and the detector ZB as a whole, (C2+C3)−(C1+C4) is a negative value, and the acceleration in the fourth direction DR4 is detected as the difference in electrostatic capacitance.

Next, a method of detecting the difference in electrostatic capacitance will be described in detail. The first fixed electrode 10A of the physical quantity sensor 1 shown in FIG. 1 is coupled to a first terminal TI1, and the second fixed electrode 10B is coupled to a second terminal TI2. The first movable body MB1 is coupled to a terminal TV1, and the second movable body MB2 is coupled to a terminal TV2. Further, the shielder S is coupled to a terminal TS.

Figure 6:
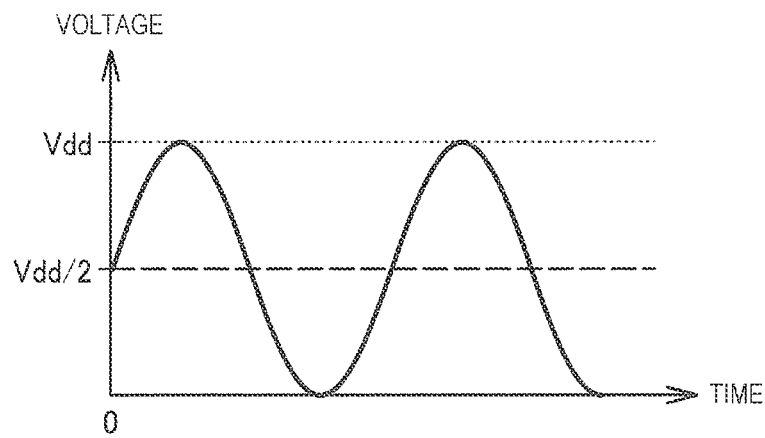
FIG. 6 is a signal waveform diagram of a drive signal input to a first movable body.
Figure 7:
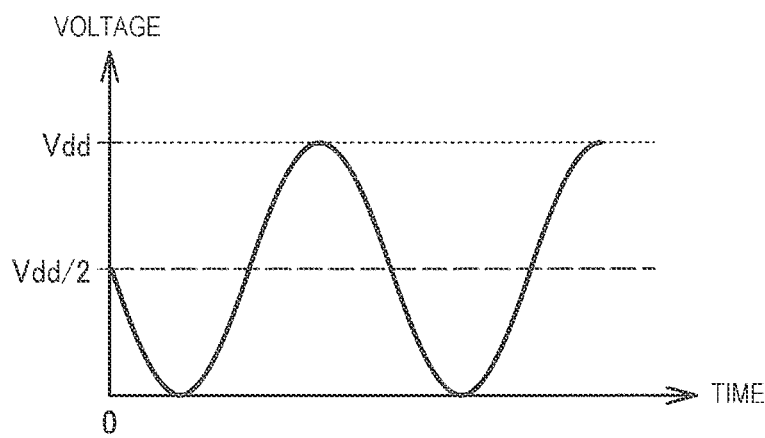
FIG. 7 is a signal waveform diagram of a drive signal input to a second movable body.
Figure 8:
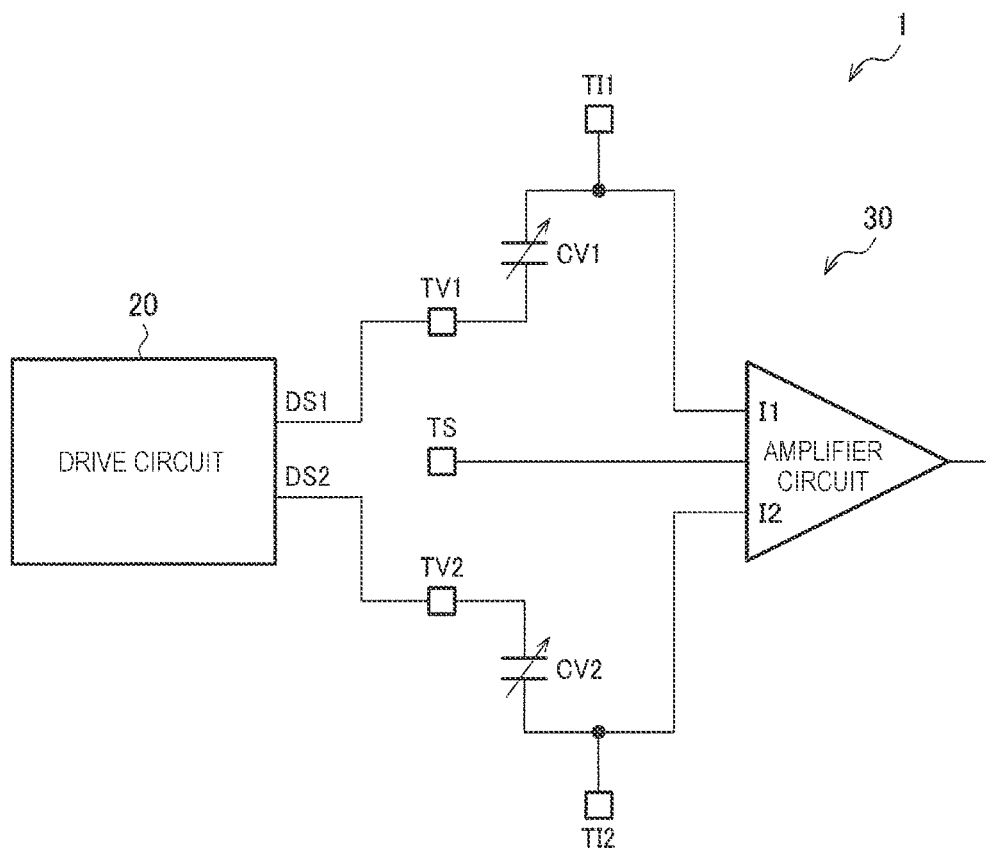
FIG. 8 is a diagram of a physical quantity detection circuit.

As shown in FIG. 8, the physical quantity sensor 1 includes a drive circuit 20 and a detection circuit 30, and the detection circuit 30 includes an amplifier circuit 32. The amplifier circuit 32 is a differential amplifier circuit. The drive circuit 20 outputs a first drive signal DS1 to the first movable body MB1. Specifically, the drive circuit 20 outputs the first drive signal DS1 to the first movable body MB1 via the terminal TV1. The drive circuit 20 outputs a second drive signal DS2 to the second movable body MB2. Specifically, the drive circuit 20 outputs the second drive signal DS2 to the second movable body MB2 via the terminal TV2. The first drive signal DS1 and the second drive signal DS2 are, for example, sine wave drive signals as shown in FIGS. 6 and 7. As shown in FIGS. 6 and 7, the second drive signal DS2 is a signal whose phase is shifted by 180° from the first drive signal DS1, and is, for example, an inverted signal of the first drive signal DS1.

The detection circuit 30 includes the amplifier circuit 32 in which the first fixed electrode 10A is coupled to the first terminal TI1 and the second fixed electrode 10B is coupled to the second terminal TI2. Specifically, the first fixed electrode 10A is coupled to the first terminal TI1 of the amplifier circuit 32 via the first terminal TI1, and the second fixed electrode 10B is coupled to the second terminal TI2 of the amplifier circuit 32 via the second terminal TI2. The amplifier circuit 32 is a differential amplifier circuit, and may be referred to as an adder circuit, for example. The first terminal TI1 of the amplifier circuit 32 is, for example, a non-inverting terminal of the differential amplifier circuit, and the second terminal TI2 is an inverting terminal.

As shown in FIGS. 6 and 7, the first drive signal DS1 and the second drive signal DS2 are sine wave signals in an amplitude range from 0 to Vdd, and a center potential of the sine wave is Vdd/2, which is an intermediate potential in the amplitude range. Further, the shielder S is set to Vdd/2, which is the intermediate potential. For example, using the terminal TS, the potential of the shielder S is set to Vdd/2, which is the intermediate potential. In the differential amplifier circuit 32, a common potential is Vdd/2 which is the intermediate potential.

The electrostatic capacitances CV1 and CV2 in FIG. 8 are the electrostatic capacitances in the detectors ZA and ZB described with reference to FIG. 5. The first drive signal DS1 and the second drive signal DS2 from the drive circuit 20 are coupled to one end of each of the electrostatic capacitances CV1 and CV2, and the other end of each of the electrostatic capacitances CV1 and CV2 is coupled to the first terminal TI1 and the second terminal TI2 of the detection circuit 30. Therefore, changes in the electrostatic capacitances CV1 and CV2 can be detected. That is, in FIG. 5, it is possible to detect (C2+C3)−(C1+C4), which is the difference in electrostatic capacitance when the acceleration acts in the third direction DR3, and (C2+C3)−(C1+C4), which is the difference in electrostatic capacitance when the acceleration acts in the fourth direction DR4. In this way, (CV1−CV2), which is the difference in electrostatic capacitance, is detected, and the acceleration can be detected.

In the embodiment, a potential of the shielder S is set to an intermediate potential between a first potential of the first movable body MB1 and a second potential of the second movable body MB2. For example, as shown in FIGS. 6 and 7, the first drive signal DS1 applied to the first movable body MB1 and the second drive signal DS2 applied to the second movable body MB2 are sine wave signals whose phases are different from each other by 180°. Therefore, a relationship in which the intermediate potential is Vdd/2 is established. The intermediate potential is between the first potential of the first drive signal DS1 applied to the first movable body MB1 and the second potential of the second drive signal DS2 applied to the second movable body MB2. By setting the potential of the shielder S to the intermediate potential between the first drive signal DS1 and the second drive signal DS2 in this way, it is possible to avoid an operational failure due to a Coulomb force.

In the embodiment, the potential of the shielder S is set to, for example, a potential the same as a potential of the substrate. For example, the shielder S is provided on the substrate on which the detection element 100 is formed, and accordingly, the potential of the shielder S is the potential the same as that of the substrate. Specifically, as described above, the walls protruding from the substrate in the third direction DR3 are formed to surround the four sides of the detection element 100, and the shielder S is coupled to the walls. Accordingly, the potential of the shielder S is set to the potential the same as that of the substrate. Specifically, the substrate of the physical quantity sensor 1 is set to Vdd/2 which is the intermediate potential between the first drive signal DS1 and the second drive signal DS2 described with reference to FIGS. 6 and 7. Accordingly, the potential of the shielder S is also set to Vdd/2 which is the intermediate potential.

In this way, in the physical quantity sensor 1 according to the embodiment, the difference in electrostatic capacitance between the first movable body MB1 and the second movable body MB2 is detected. Here, as described with reference to FIGS. 6 and 8, since different voltages are applied to the first movable body MB1 and the second movable body MB2, a Coulomb force is generated between both movable bodies. It is a problem whether the Coulomb force has an influence on the twisting motion of each movable body. As described above, the first movable body MB1 and the second movable body MB2 can perform free swinging motion with the second direction DR2 as the rotation axis upon receiving an acceleration in the third direction DR3. However, the movable bodies are interfered with the twisting motion thereof due to the Coulomb force.

Figure 9:
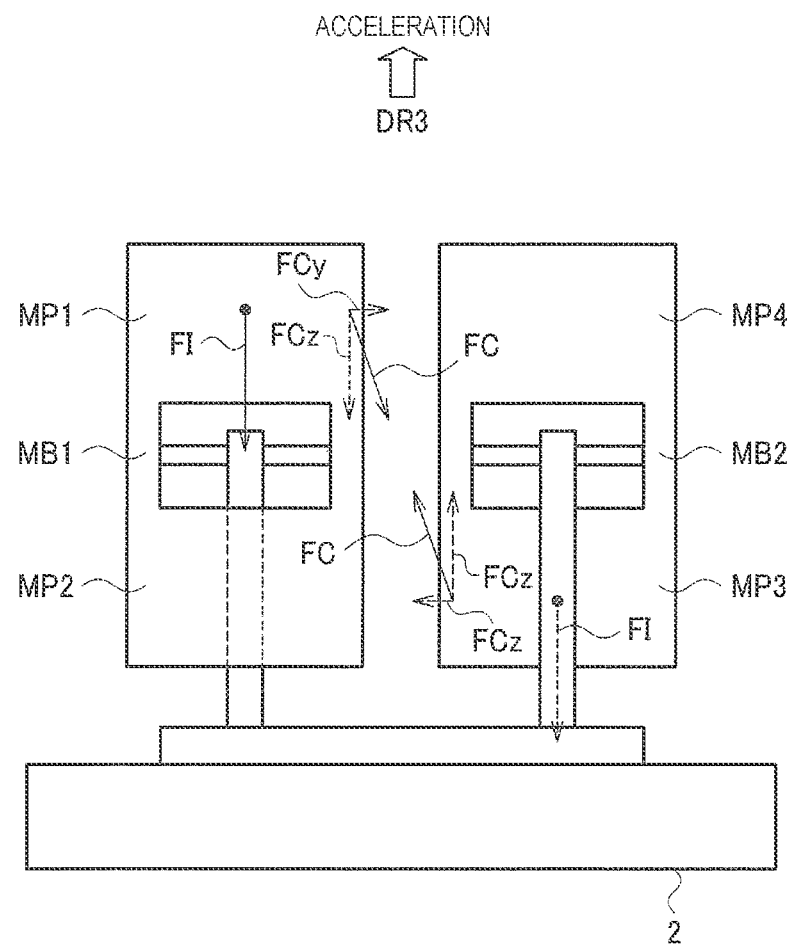
FIG. 9 is a diagram showing an electric field generated between a first movable body and a second movable body when a shielder is not provided.

FIG. 9 is a diagram showing an influence of the Coulomb force generated between the first movable body MB1 and the second movable body MB2 on the twisting motion of each movable body. Specifically, FIG. 9 is a side view of the physical quantity sensor 1 according to the embodiment as viewed from a −X direction side, and shows the influence of the Coulomb force by taking a case where an acceleration in the third direction DR3 is generated as an example. FIG. 9 shows a side view when the shielder S is not provided in order to focus on the influence of the Coulomb force applied to each movable body. As described with reference to FIG. 5, when the acceleration in the third direction DR3 is generated, the first movable body MB1 receives an inertial force in a direction opposite to the direction of the acceleration. In the case of FIG. 9, since the acceleration is generated in the third direction DR3, each of the first movable body MB1 and the second movable body MB2 receives an inertial force FI in the fourth direction DR4. Here, focusing on the movement of the first mass part MP1 of the first movable body MB1, the first mass part MP1 also receives the Coulomb force in addition to the inertial force FI in the fourth direction DR4. Among Coulomb forces, when a Coulomb force FC acting between the first mass part MP1 and the third mass part MP3 arranged side by side in the second direction DR2 is discussed, the Coulomb force FC is generated in an oblique direction in a YZ plane view as shown in FIG. 9. Therefore, the twisting motion of the first mass part MP1 is affected by a FCz which is a component of the Coulomb force FC in the third direction DR3. Since the Coulomb force FCz acts in the fourth direction DR4 in FIG. 9, the first mass part MP1 receives the Coulomb force FCz in the same direction in addition to the inertial force FI in the fourth direction DR4. Therefore, the first mass part MP1 is pulled with a stronger force in the fourth direction DR4. On the other hand, focusing on the third mass part MP3 of the second movable body MB2, since the component FCz of the Coulomb force FC in the third direction DR3 is in the third direction DR3, the third mass part MP3 receives the Coulomb force FCz in a direction opposite to the inertial force FI in the fourth direction DR4. Therefore, a part of the inertial force FI acting on the third mass part MP3 is canceled by the Coulomb force FCz, and the second movable body MB2 receives a force weaker than the inertial force FI. The first mass part MP1 and the third mass part MP3 that are closest to each other are discussed above, and if the first mass part MP1 and the fourth mass part MP4 that are in the second proximity relationship are also discussed, the first mass part MP1 is more significantly affected by the Coulomb force FCz. The Coulomb force FCz generated according to a twist position of the movable body generates an acceleration derived from an equation of motion in relation to the mass of each mass part. Therefore, in addition to the acceleration caused by the force in the third direction DR3 applied from the outside of the physical quantity sensor 1, the acceleration is also generated by an internal state of the physical quantity sensor 1.

Figure 10:
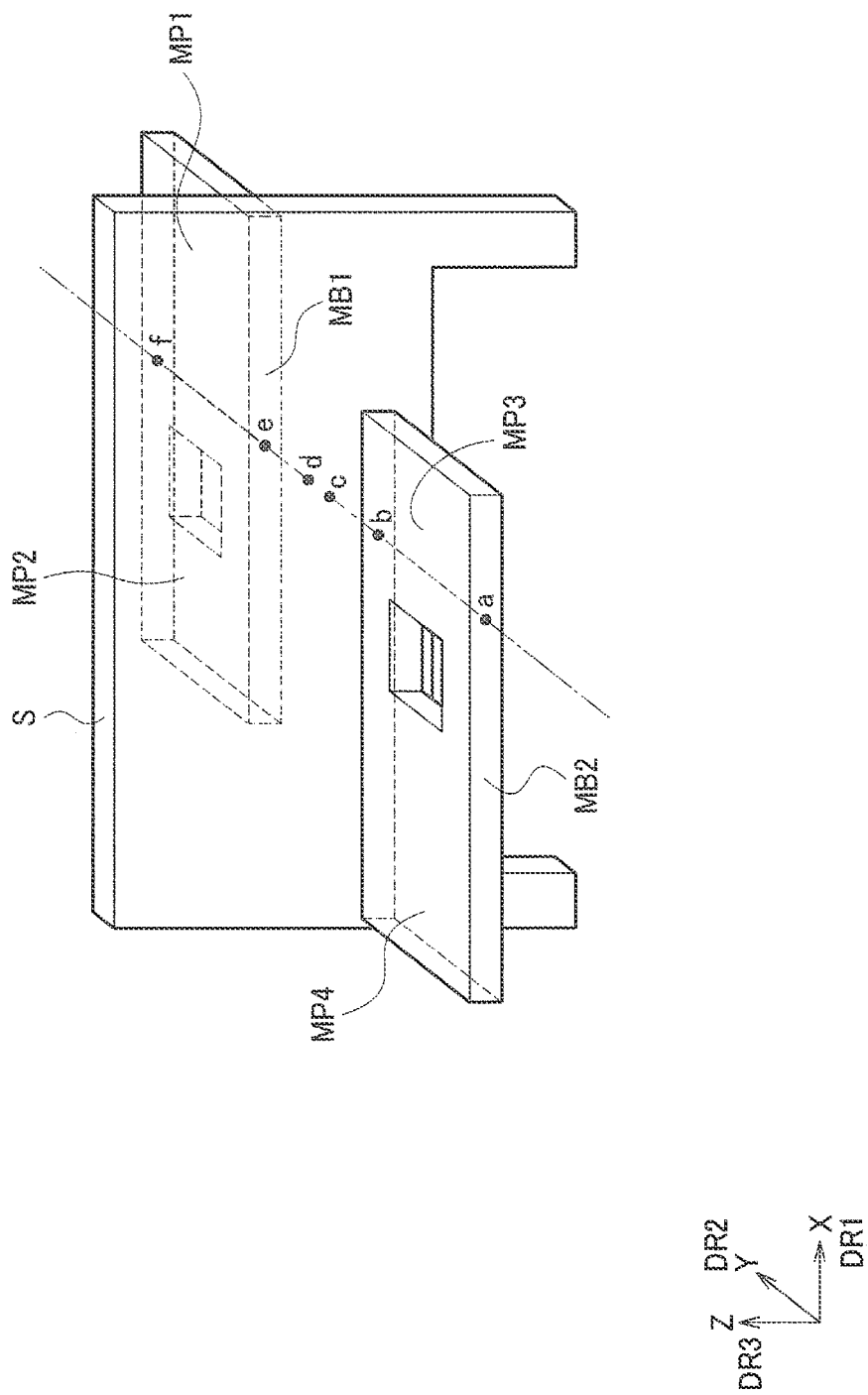
FIG. 10 is a diagram showing a path between the first movable body and the second movable body.

FIGS. 10 to 13 are diagrams showing a role of the shielder S on the influence of the Coulomb force FC described above. FIG. 10 is a perspective view of the physical quantity sensor 1 according to the embodiment. As described with reference to FIG. 9, the Coulomb force FC is generated by a potential difference between the first movable body MB1 and the second movable body MB2. Therefore, potentials along a path passing through a, b, c, d, e, and f shown in FIG. 10 will be discussed.

Figure 11:
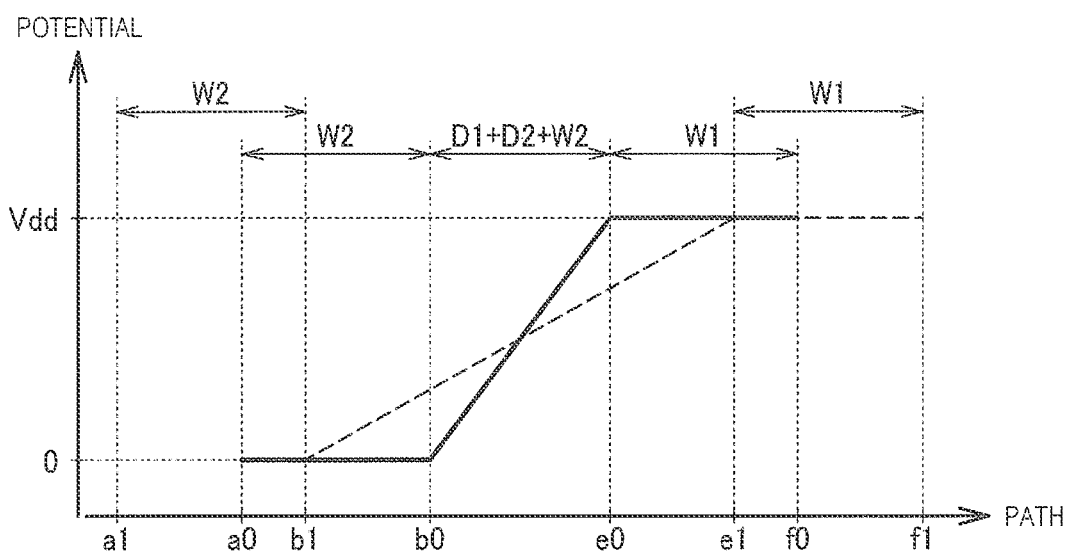
FIG. 11 is a diagram showing a potential distribution between the first movable body and the second movable body when the shielder is not provided.
Figure 12:
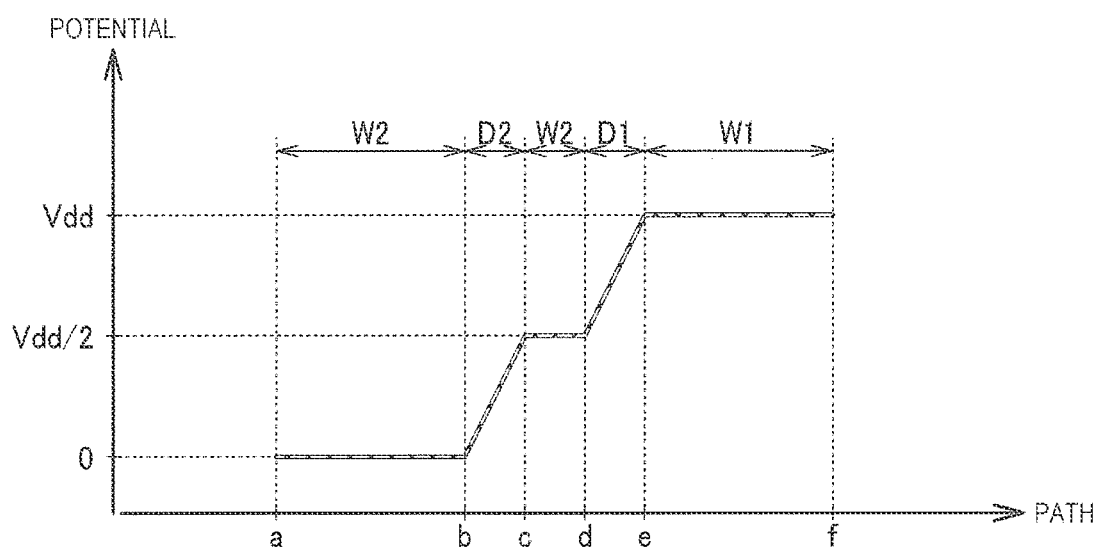
FIG. 12 is a diagram showing a potential distribution between the first movable body and the second movable body when the shielder is provided.

First, a case where the shielder S is not provided will be discussed. FIG. 11 shows a voltage distribution along the path when the shielder S is not provided. Since the shielder S is not provided, there are no c and d among a to f. In FIG. 11, a horizontal axis represents a path indicated by a to f, and a vertical axis represents a potential at each position on the path. As described with reference to FIG. 5, in a stationary state, both the first movable body MB1 and the second movable body MB2 are horizontal, and for example, the distance between the movable bodies, that is, between the first mass part MP1 of the first movable body MB1 and the third mass part MP3 of the second movable body MB2, is the shortest. On the other hand, when the acceleration is generated in the third direction DR3 or the fourth direction DR4, the first movable body MB1 and the second movable body MB2 are inclined in opposite directions. In this case, for example, the distance between the first mass part MP1 and the third mass part MP3 increases. In FIG. 11, potentials along the path when the movable bodies are in the horizontal state are indicated by a solid line, and potentials along the path when the movable bodies are inclined in opposite directions due to the acceleration in the third direction DR3 or the fourth direction DR4 are indicated by a broken line. As described with reference to FIGS. 6 and 7, a first potential V1 and a second potential V2, which are different potentials, are applied to the first movable body MB1 and the second movable body MB2. In FIG. 11 and FIG. 12 to be described later, it is assumed that the first potential V1 of the first movable body MB1 is Vdd and the second potential V2 of the second movable body MB2 is 0. Coordinates when the movable bodies are in a horizontal state are represented by a0, b0, e0, and f0, and coordinates when the movable bodies are inclined in opposite directions are represented by a1, b1, e1, and f1. First, when the movable bodies are in the horizontal state, the distance between the first mass part MP1 and the second mass part MP3 is the shortest, and thus the distance between b0 and e0 is the shortest. That is, facing parts of the first mass part MP1 and the third mass part MP3 are closest to each other. The closest distance is represented by (D1+D2+Ws) using the distances D1 and D2 and the width Ws shown in FIG. 1. Therefore, a potential gradient between b0 and e0 is steep as indicated by the solid line in FIG. 11, a strong electric field along the first direction DR1 is generated in the first mass part MP1 and the second mass part MP3, and the Coulomb force FC received by each movable body also increases. On the other hand, when the movable bodies are inclined in opposite directions, a potential gradient between b1 to e1 is gentle as indicated by the broken line in FIG. 11, and the electric field between the first mass part MP1 and the second mass part MP3 is small. Therefore, the Coulomb force FC received by each movable body is small. However, when the movable bodies are inclined in opposite directions, the component FCz along the Z direction of the Coulomb force FC is generated as described with reference to FIG. 9. According to the configuration in which the shielder S is not provided as described above, a magnitude and a direction of the Coulomb force FC fluctuate depending on a positional relationship between the movable bodies. In particular, a fluctuation in the Z-direction component FCz of the Coulomb force FC interferes with the free swinging motion of each movable body around the rotation axis thereof.

Figure 13:
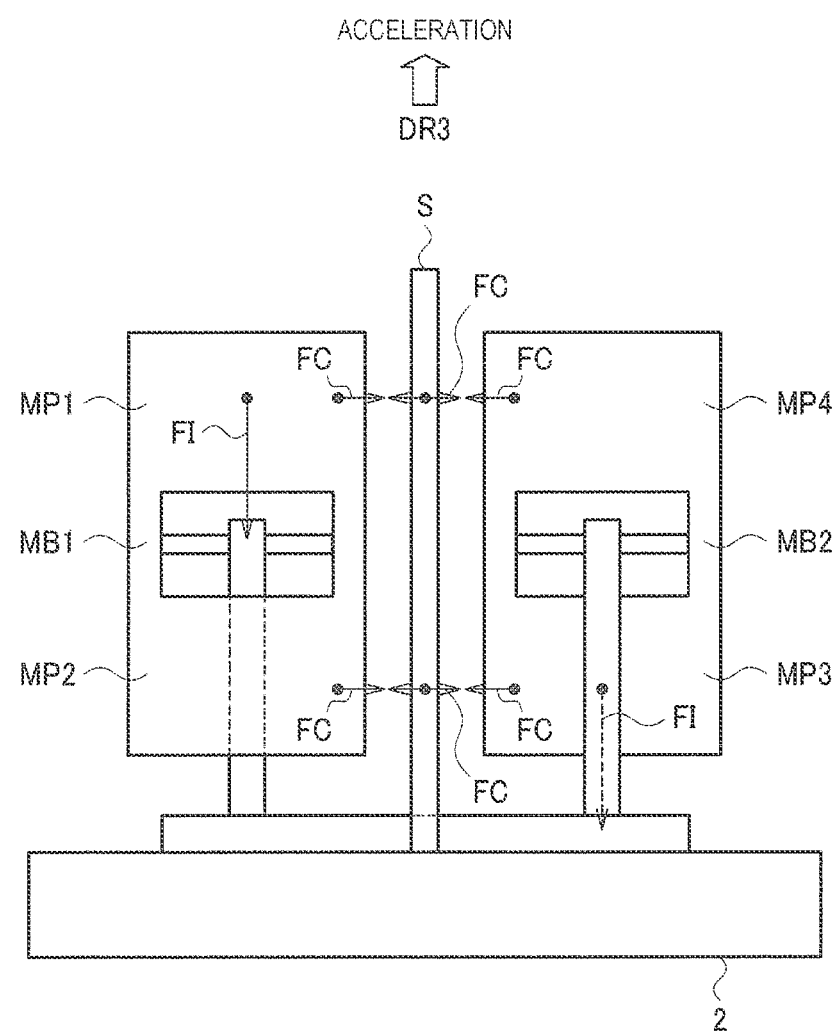
FIG. 13 is a diagram showing an electric field generated between the first movable body and the second movable body when the shielder is provided.

Next, a case where the shielder S is provided will be discussed. FIG. 12 shows a potential distribution along a path passing through a to f when the shielder S is provided. Unlike the graph shown in FIG. 11, since the shielder S is provided, c and d are shown in addition to a, b, e, and f. Similarly to FIG. 11, the potential distribution when the movable bodies are in the horizontal state is indicated by a solid line, and the potential distribution when the movable bodies are inclined in opposite directions is indicated by a broken line. Here, as described with reference to FIGS. 6 and 7, the intermediate potential between the first potential V1 and the second potential V2 is applied to the shielder S. The intermediate potential is, for example, a potential obtained by substantially averaging the first potential V1 and the second potential V2, and can be set to a potential between the first potential V1 and the second potential V2. Therefore, even if the positional relationship between the movable bodies changes due to the acceleration in the third direction DR3, the shielder S having the intermediate potential is always present right beside each mass part. That is, regardless of the distance between the first mass part MP1 and the third mass part MP3, the shielder S is present on a −Y direction side of the first mass part MP1, and the shielder S is also present on a +Y direction side of the third mass part MP3. Therefore, regardless of the positional relationship between the movable bodies, the distance between each mass part and the shielder S right beside the mass part is maintained constant, and an electric field obtained from the potential difference and the distance from the shielder S is also constant. As shown in FIG. 12, when the shielder S is provided, the potential distribution in the horizontal state indicated by the solid line and the potential distribution when the movable bodies are inclined in opposite directions indicated by the broken line coincide with each other. FIG. 13 is a side view showing what kind of Coulomb force is generated in each mass part when the shielder S is provided. As shown in FIG. 13, the Coulomb force FC is always generated in a direction along the second direction DR2 between each movable body and the shielder S right beside each movable body. In this way, when the shielder S is provided, the Coulomb force FC generated between each mass part and the shielder S is constant regardless of the positional relationship of the movable bodies, and is generated in the direction along the second direction DR2. Further, it is possible to prevent the Coulomb force from directly acting between the mass parts. Therefore, the Z-direction component FCz of the Coulomb force FC that inhibits the free swinging motion of the movable bodies as described with reference to FIG. 9 is not generated, and the physical quantity sensor 1 can detect an acceleration along the third direction DR3 with high accuracy.

When the shielder S is not provided, the electric field fluctuates according to the positional relationship between the movable bodies, and such fluctuation in the electric field may generate a magnetic field, and may cause a problem such as noise in detection of a physical quantity. In this regard, in the embodiment, the electric field generated between each movable body and the shielder S can be maintained constant, and a measurement failure due to the fluctuation in the electric field can be prevented. Therefore, according to the embodiment, it is possible to improve detection accuracy of the physical quantity such as the acceleration.

That is, the physical quantity sensor 1 according to the embodiment relates to the physical quantity sensor 1 that detects, when the directions orthogonal to one another are the first direction DR1, the second direction DR2, and the third direction DR3, a physical quantity in the third direction DR3, and includes the substrate 2, the anchors 40 and 80, the support beams 42 and 82, the first movable body MB1, the second movable body MB2, and the shielder S. The substrate 2 is orthogonal to the third direction DR3, and the first fixed electrode 10A and the second fixed electrode 10B are provided on the substrate 2. The anchors 40 and 80 are fixed to the substrate 2. One ends of the support beams 42 and 82 are coupled to the anchors 40 and 80, respectively. The first movable body MB1 is provided to be swingable with respect to the substrate 2 about the first rotation axis along the second direction DR2, and faces the first fixed electrode 10A and the second fixed electrode 10B on both sides of the first rotation axis. The second movable body MB2 is provided to be swingable with respect to the substrate 2 about the second rotation axis along the second direction DR2, and faces the first fixed electrode 10A and the second fixed electrode 10B on both sides of the second rotation axis. The shielder S is provided between the first movable body MB1 and the second movable body MB2 along the first direction DR1.

In this way, the physical quantity sensor 1 can detect the physical quantity by the swinging motion of the first movable body MB1 and the second movable body MB2. The first movable body MB1 and the second movable body MB2 can be separated from each other by the shielder S provided between the first movable body MB1 and the second movable body MB2, and the movable bodies can be prevented from interfering with each other. Therefore, the first movable body MB1 and the second movable body MB2 can perform the free swinging motion around the rotation axes, and the physical quantity sensor 1 can detect the physical quantity in the third direction DR3 with high accuracy.

According to the embodiment, the physical quantity sensor can detect the physical quantity by the swinging motion of the first movable body and the second movable body. The first movable body and the second movable body can be separated from each other by the shielder provided between the first movable body and the second movable body, and the movable bodies can be prevented from interfering with each other. Therefore, the first movable body and the second movable body can perform the free swinging motion, and the physical quantity sensor can detect the physical quantity in the third direction with high accuracy.

In the embodiment, the potential of the shielder S may be set to an intermediate potential between the first potential V1 of the first movable body MB1 and the second potential V2 of the second movable body MB2. In this way, the magnitude of the electric field generated between the first movable body MB1 and the shielder S and the magnitude of, for example, the electric field generated between the second movable body MB2 and the shielder S can be adjusted to the same degree.

In the embodiment, the potential of the shielder S may be set to a potential the same as the potential of the substrate. In this way, it is possible to prevent the generation of an electric field between the substrate 2 and the shielder S.

In the embodiment, the shielder S may be a wall provided on the substrate 2. In this way, the first movable body MB1 and the second movable body MB2 can be prevented from being adjacent to each other, and each movable body is always maintained at a constant distance from the shielder S. Therefore, the electric field acting between the first movable body MB1 and the second movable body MB2 can be made constant, and the electric field can be controlled in the direction along the second direction DR2. Therefore, the first movable body MB1 and the second movable body MB2 do not receive the Coulomb force in the third direction DR3, and the physical quantity sensor 1 can detect the physical quantity with high accuracy.

In the embodiment, the first rotation axis and the second rotation axis extend along the second direction. In this way, both the first movable body MB1 and the second movable body MB2 can perform the twisting motion around the rotation axis thereof along the second direction DR2. Therefore, in a plan view, it is easy to arrange the first movable body and the second movable body having a rectangular shape with the first direction DR1 as a long side along the second direction. Accordingly, it is possible to provide the first rotation axis and the second rotation axis at positions close to each other, and when the substrate 2 is deformed by, for example, a stress or the like, it is possible to adjust the influence on the swinging motion in the movable bodies to the same degree, and it is possible to maintain the detection accuracy of the physical quantity.

In the embodiment, the first movable body may include the first mass part provided in the first direction from the first rotation axis, and the second mass part provided in a direction opposite to the first direction from the first rotation axis and heavier than the first mass part, and the second movable body may include the third mass part provided in the first direction from the second rotation axis, and the fourth mass part provided in a direction opposite to the first direction from the second rotation axis and lighter than the third mass part.

In this way, the mass of the second mass part MP2 provided on the opposite direction side to the first direction DR1 from the first rotation axis is heavier than the mass of the first mass part MP1 provided in the first direction DR1 from the first rotation axis. Therefore, torque is generated in the rotary motion system including the first movable body MB1 by an external acceleration, and it is possible to detect a physical quantity such as an acceleration. The mass of the fourth mass part MP4 provided on the opposite direction side to the first direction DR1 from the second rotation axis is lighter than the mass of the third mass part MP3 provided in the first direction DR1 from the second rotation axis. Therefore, torque is also generated in the rotary motion system including the second movable body MB2 by the external acceleration, and it is possible to detect a physical quantity such as an acceleration. A mode in which the second mass part MP2 is heavier than the first mass part MP1 is not limited to the mode shown in FIG. 1 and the like. For example, even if the lengths of the first mass part MP1 and the second mass part MP2 along the second direction DR2 are equal, the second mass part MP2 may be heavier than the first mass part MP1 due to a large thickness of the second mass part MP2 in the third direction DR3. The same applies to the third mass part MP3 and the fourth mass part MP4.

FIG. 14 is a plan view of a second configuration example according to the embodiment. The second configuration example is different from the first configuration example shown in FIG. 1 in the shape of the shielder S. Specifically, in the configuration example of FIG. 1, the shielder S has a rectangular shape with the second direction DR2 as a long side in a plan view, whereas in the second configuration example, the shielder S is bent and includes a first shield S1 along the first direction DR1, a second shield S2 extending from one end of the first shield S1 toward the second direction DR2, and a third shield S3 extending from the other end of the first shield S1 toward a direction opposite to the second direction DR2. The shielder S may include only one of the second shield S2 and the third shield S3.

Figure 15:
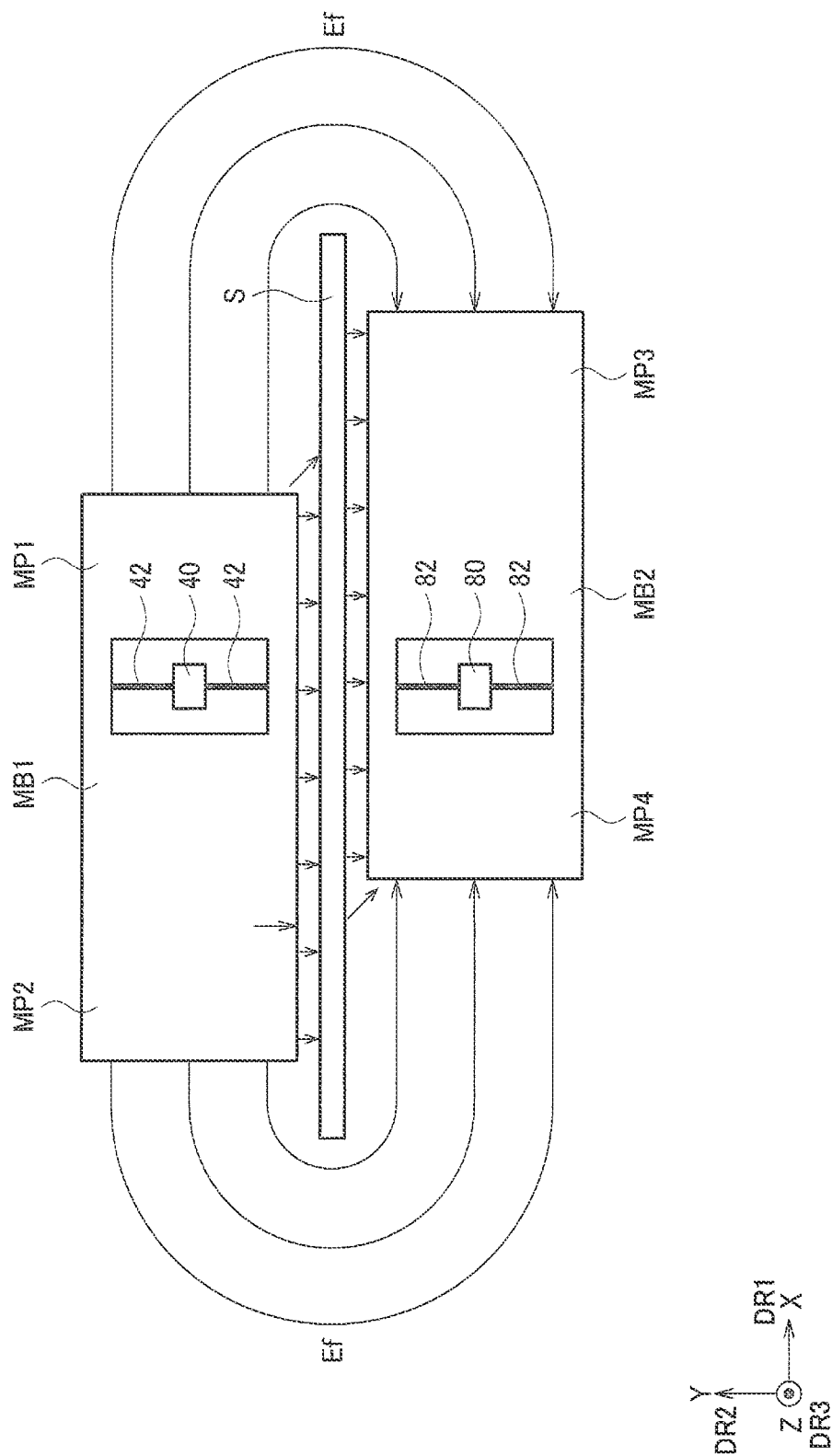
FIG. 15 is a diagram showing a state of a fringe electric field in the first configuration example.

FIG. 15 is a schematic diagram showing a state of the electric field in the first configuration example in a plan view. In the description of FIGS. 9 to 13, regarding the Coulomb force FC acting between the movable bodies, only the facing parts that are in contact with each other are described. However, in practice, as shown in FIG. 15, lines of electric force are also output from the short sides of the first movable body MB1 and the second movable body MB2 along the second direction DR2, and fringe electric fields Ef are generated to go around outside of the shielder S. In this case, a magnitude and a direction of the fringe electric field Ef change in accordance with the swinging motion of each movable body, and the Coulomb force FCz which is the Z-direction component is generated. Since such a fringe electric field Ef is generated to go around the outside of the shielder S by a long distance, the fringe electric field is a relatively gentle electric field. However, since the fringe electric field Ef acts on a portion farthest from the rotation axis of each movable body, a contribution to the torque obtained by a product of the distance from the rotation axis and the force increases. Therefore, the influence of the fringe electric field Ef on the swinging motion of each movable body also increases.

Figure 16:
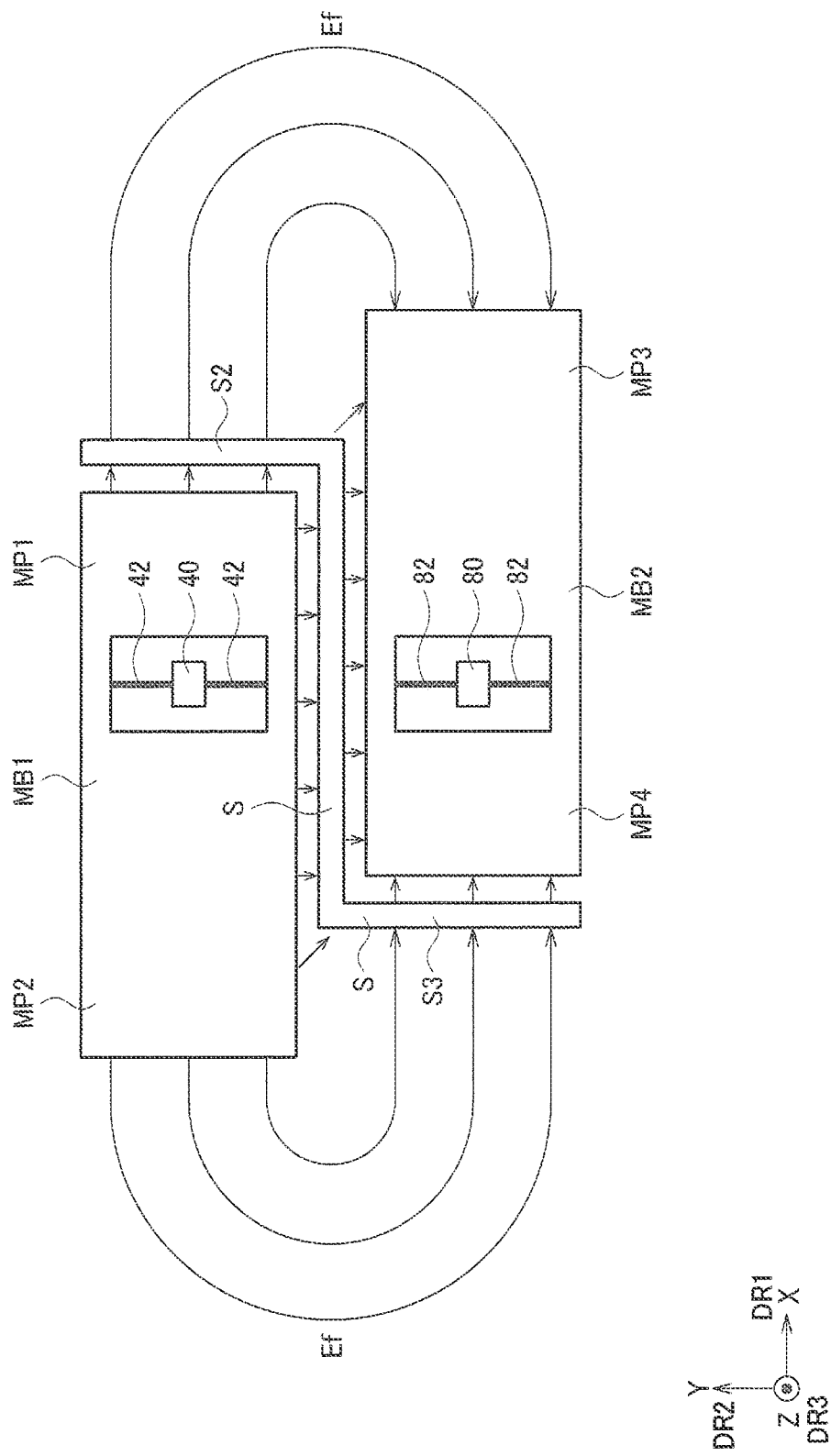
FIG. 16 is a diagram showing a state of a fringe electric field in the second configuration example.

In this regard, according to the second configuration example, for the first movable body MB1, the shielder S includes the second shield S2 and the third shield S3, the fringe electric field Ef can be shielded, and the generation of the Coulomb force FC due to the fringe electric field Ef can be prevented. FIG. 16 is a schematic diagram showing a state of an electric field in a plan view in a case where the second configuration example is applied. The first mass part MP1 of the first movable body MB1 is provided so that the second shield S2 of the shielder S faces the first direction DR1 side, and the electric field is always maintained constant. The fourth mass part MP4 of the second movable body MB2 is provided so that the third shield S3 of the shielder S faces an opposite direction side to the first direction DR1, and the electric field is always maintained constant regardless of the positional relationship between the movable bodies. Therefore, the first mass part MP1 of the first movable body MB1 and the fourth mass part MP4 of the second movable body MB2 are not interfered with by the Z-direction component FCz of the Coulomb force. Therefore, the physical quantity in the third direction DR3 can be detected with high accuracy.

That is, in the embodiment, the shielder S includes the first shield S1 extending along the first direction DR1 between the first movable body MB1 and the second movable body MB2, and the second shield S2 extending in the second direction DR2 from one end of the first shield S1 to surround the first movable body MB1. In this way, the generation of the fringe electric field Ef can be prevented, the first mass part MP1 of the first movable body MB1 is less likely to receive the Coulomb force FCz which is the Z-direction component due to the fringe electric field Ef, and the physical quantity in the third direction DR3 can be detected with high accuracy.

In the embodiment, the shielder S includes the third shield S3 extending from the other end of the first shield S1 in the direction opposite to the second direction DR2 to surround the second movable body MB2. In this way, since the fourth mass part MP4 of the second movable body MB2 in addition to the first mass part MP1 of the first movable body MB1 does not receive the Coulomb force FC due to the fringe electric field Ef, an acceleration in the third direction DR3 can be detected with high accuracy.

Figure 18:
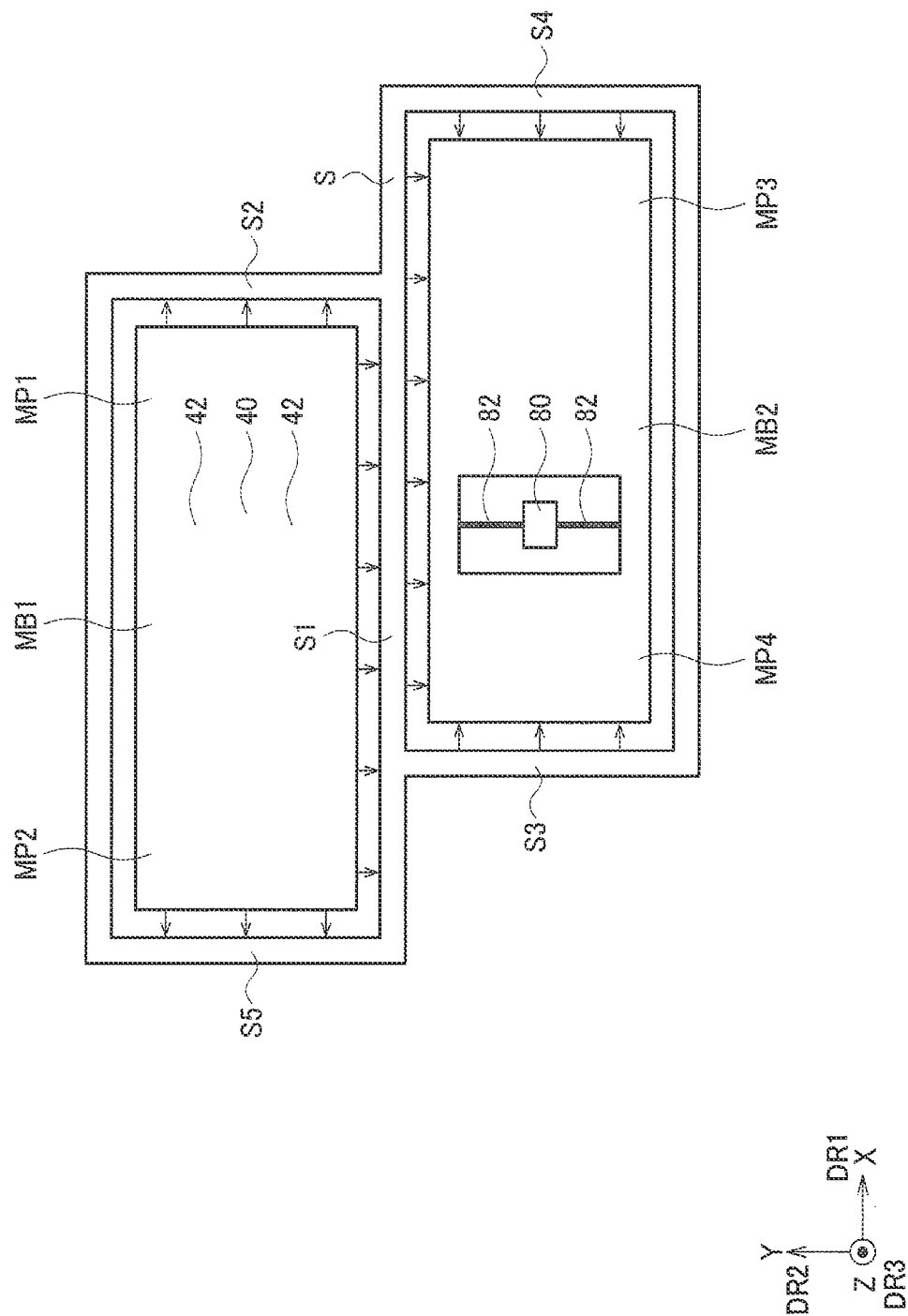
FIG. 18 is a diagram showing a state of a fringe electric field in the third configuration example.

FIG. 17 is a plan view of a third configuration example according to the embodiment. A difference from the second configuration example shown in FIG. 14 is that the shielder S includes a fourth shield S4 and a fifth shield S5. The shielder S may have a frame shape surrounding the first movable body MB1 and the second movable body MB2, in which the second shield S2 and the fifth shield S5 are coupled to each other around the first movable body MB1, and the third shield S3 and the fourth shield S4 are also coupled to each other around the second movable body MB2. FIG. 18 is a schematic diagram showing a state of an electric field in the third configuration example in a plan view. According to the third configuration example, all the short sides of the movable bodies along the second direction DR2 face the shielder S. Therefore, as shown in FIG. 18, the short side of any mass part along the second direction DR2 is maintained at the same distance from the shielder S facing each mass part, and receives a constant Coulomb force FC. Further, the Coulomb force FC is at a direction along the first direction DR1 and does not include the Coulomb force FCz which is the Z-direction component. Therefore, according to the third configuration example, the Coulomb force FCz in the Z direction due to the fringe electric field Ef can be prevented in all the mass parts, and the acceleration in the third direction DR3 can be detected with higher accuracy.

2. Inertial Measurement Unit

Figure 19:
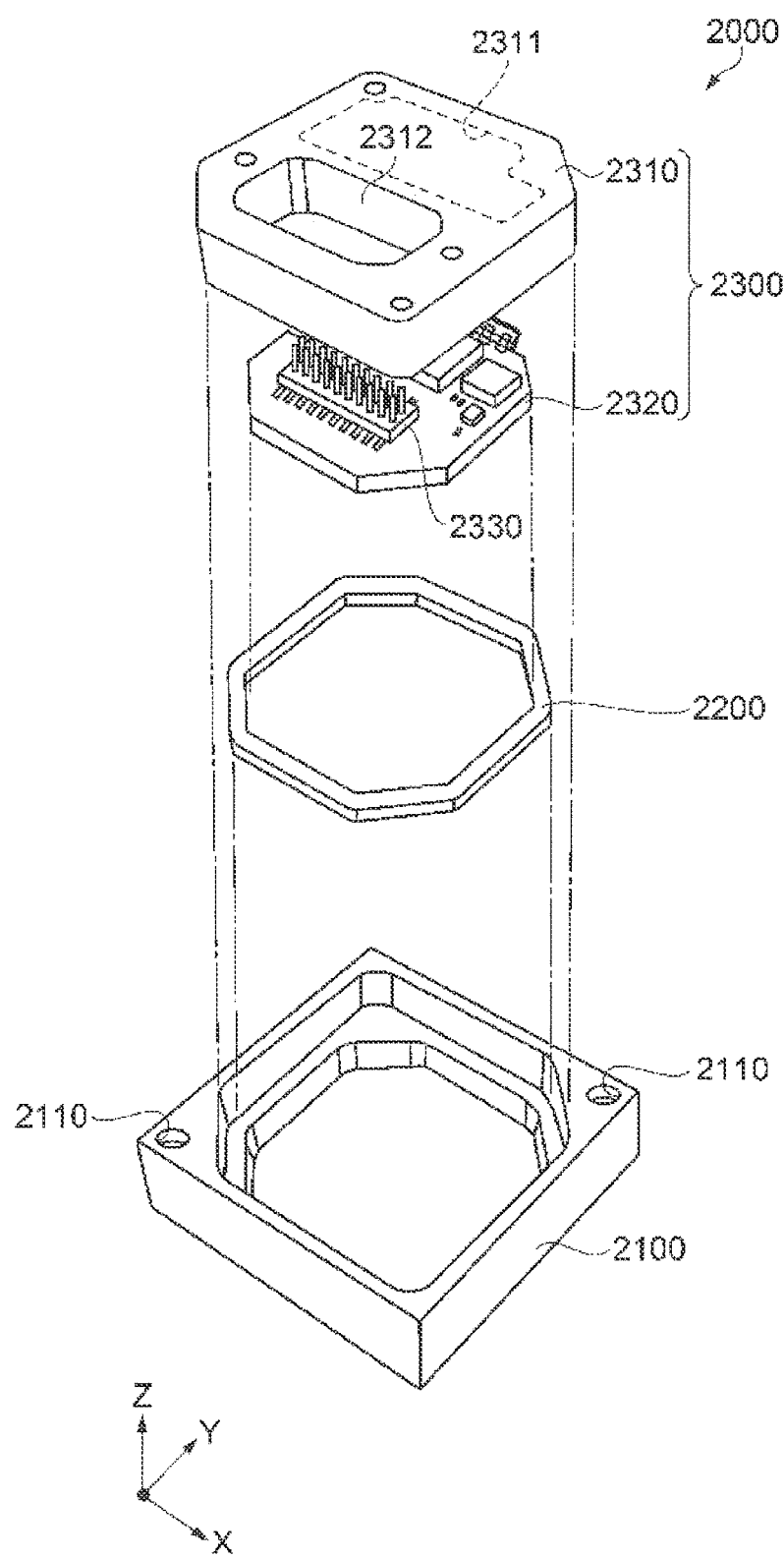
FIG. 19 is an exploded perspective view showing a schematic configuration of an inertial measurement unit including the physical quantity sensor.

Next, an example of an inertial measurement unit 2000 according to the embodiment will be described with reference to FIGS. 19 and 20. The inertial measurement unit (IMU) 2000 shown in FIG. 19 is a device that detects an inertial movement amount of a posture or a behavior of a moving body such as an automobile or a robot. The inertial measurement unit 2000 is a so-called six-axis motion sensor including an acceleration sensor that detects accelerations ax, ay, and az in directions along three axes and an angular velocity sensor that detects angular velocities ωx, ωy, and ωz around three axes.

The inertial measurement unit 2000 has a rectangular parallelepiped shape and a substantially square planar shape. Screw holes 2110 as mount portions are formed in the vicinity of two vertexes located in a diagonal direction of the square. Two screws can be inserted into the two screw holes 2110 to fix the inertial measurement unit 2000 to a mounted surface of a mounted body such as an automobile. It is also possible to reduce a size to a degree that can be mounted on a smartphone or a digital camera, for example, by selecting a component or changing a design.

The inertial measurement unit 2000 includes an outer case 2100, a bonding member 2200, and a sensor module 2300, and has a configuration in which the sensor module 2300 is inserted inside the outer case 2100 with the bonding member 2200 interposed therebetween. The sensor module 2300 includes an inner case 2310 and a circuit board 2320. The inner case 2310 is formed with a recess 2311 for preventing contact with the circuit board 2320 and an opening 2312 for exposing a connector 2330 to be described later. Further, the circuit board 2320 is bonded to a lower surface of the inner case 2310 via an adhesive.

Figure 20:
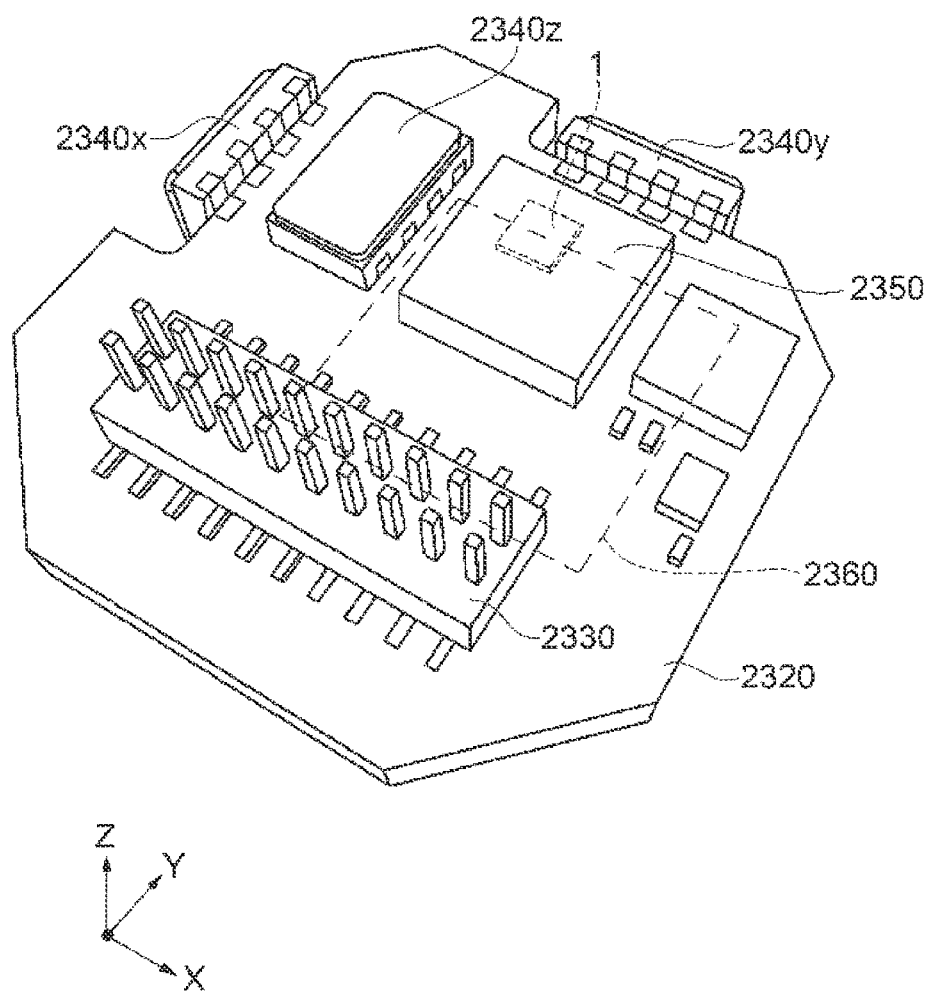
FIG. 20 is a perspective view of a circuit board of the physical quantity sensor.

As shown in FIG. 20, the connector 2330, an angular velocity sensor 2340$z$ that detects an angular velocity around the Z axis, an acceleration sensor unit 2350 that detects an acceleration in each axial direction of an X axis, a Y axis, and the Z axis, and the like are mounted on an upper surface of the circuit board 2320. An angular velocity sensor 2340$x$ that detects an angular velocity around the X axis and an angular velocity sensor 2340$y$ that detects an angular velocity around the Y axis are mounted on a side surface of the circuit board 2320.

The acceleration sensor unit 2350 includes at least the physical quantity sensor 1 that measures the acceleration in the Z-axis direction described above, and can detect the acceleration in one axial direction or the accelerations in two axial directions or three axial directions as necessary. The angular velocity sensors 2340x, 2340y, and 2340z are not particularly limited, and for example, a vibration gyro sensor using a Coriolis force can be used.

A control IC 2360 is mounted on a lower surface of the circuit board 2320. The control IC 2360, as a controller, that performs control based on a detection signal output from the physical quantity sensor 1 is, for example, a micro controller unit (MCU), includes a storage including a nonvolatile memory, an A/D converter, and the like, and controls units in the inertial measurement unit 2000. A plurality of electronic components are also mounted on the circuit board 2320.

As described above, the inertial measurement unit 2000 according to the embodiment includes the physical quantity sensor 1 and the control IC 2360 as the controller that performs the control based on the detection signal output from the physical quantity sensor 1. According to the inertial measurement unit 2000, since the acceleration sensor unit 2350 including the physical quantity sensor 1 is used, an effect of the physical quantity sensor 1 can be achieved, and the inertial measurement unit 2000 capable of implementing high accuracy and the like can be provided.

The inertial measurement unit 2000 is not limited to the configurations in FIGS. 19 and 20. For example, the inertial measurement unit 2000 may have a configuration in which only the physical quantity sensor 1 is provided as the inertial sensor without providing the angular velocity sensors 2340x, 2340y, and 2340z. In this case, for example, the inertial measurement unit 2000 may be implemented by accommodating the physical quantity sensor 1 and the control IC 2360 that implements the controller in a package that is a housing container.

That is, the physical quantity sensor according to the embodiment relates to a physical quantity sensor that detects, when directions orthogonal to one another are a first direction, a second direction, and a third direction, a physical quantity in the third direction, and includes a substrate, anchors, support beams, a first movable body, a second movable body, and a shielder. The substrate is orthogonal to the third direction, and the first fixed electrode and the second fixed electrode are provided on the substrate. The anchors are fixed to the substrate. One end of the support beam is coupled to the anchor. The first movable body is provided to be swingable with respect to the substrate about a first rotation axis along the second direction, and faces the first fixed electrode and the second fixed electrode on both sides of the first rotation axis. The second movable body is provided to be swingable with respect to the substrate about a second rotation axis along the second direction, and faces the first fixed electrode and the second fixed electrode on both sides of the second rotation axis. The shielder is provided between the first movable body and the second movable body along the first direction.

According to the embodiment, the physical quantity sensor can detect the physical quantity by a swinging motion of the first movable body and the second movable body. The first movable body and the second movable body can be separated from each other by the shielder provided between the first movable body and the second movable body, and the movable bodies can be prevented from interfering with each other. Therefore, the first movable body and the second movable body can perform a free swinging motion, and the physical quantity sensor can detect the physical quantity in the third direction with high accuracy.

In the embodiment, a potential of the shielder may be set to an intermediate potential between a first potential of the first movable body and a second potential of the second movable body.

In this way, a magnitude of the electric field and the like generated between the first movable body and the shielder and a magnitude of the electric field and the like generated between the second movable body and the shielder can be adjusted to the same degree.

In the embodiment, a potential of the shielder may be set to a potential the same as the potential of the substrate.

In this way, it is possible to prevent the generation of an electric field between the substrate and the shielder.

In the embodiment, the shielder may be a wall provided on the substrate.

In this way, the first movable body and the second movable body can be prevented from being adjacent to each other, and each movable body is always maintained at a constant distance from the shielder. Therefore, the magnitude of the electric field acting between the first movable body and the second movable body can be made constant, and the electric field can be controlled in the direction along the second direction. Therefore, the first movable body and the second movable body do not receive a Coulomb force in the third direction, and the physical quantity sensor 1 can detect the physical quantity with high accuracy.

In the embodiment, the shielder may include a first shield extending along the first direction between the first movable body and the second movable body, and a second shield extending from one end of the first shield in the second direction to surround the first movable body.

In this way, it is possible to prevent the generation of a Coulomb force due to a fringe electric field, and the Coulomb force due to the fringe electric field is less likely to act on the first mass part of the first movable body. Therefore, the physical quantity sensor 1 can detect the physical quantity in the third direction with high accuracy.

In the embodiment, the shielder may include a third shield extending from the other end of the first shield in a direction opposite to the second direction to surround the second movable body.

In this way, since the Coulomb force due to the fringe electric field is less likely to act on the fourth mass part of the second movable body in addition to the first mass part of the first movable body, the physical quantity in the third direction DR3 can be detected with higher accuracy.

In the embodiment, the first rotation axis and the second rotation axis may extend along the second direction.

In this way, both the first movable body and the second movable body can perform a twisting motion around the rotation axis along the second direction. Therefore, it is easy to arrange the first movable body and the second movable body having a rectangular shape with the first direction as a long side in a plan view along the second direction.

In the embodiment, the first movable body may include the first mass part provided in the first direction from the first rotation axis, and the second mass part provided in a direction opposite to the first direction from the first rotation axis and heavier than the first mass part, and the second movable body may include the third mass part provided in the first direction from the second rotation axis, and the fourth mass part provided in a direction opposite to the first direction from the second rotation axis and lighter than the third mass part.

In this way, a mass of the second mass part provided in a direction opposite to the first direction from the first rotation axis is heavier than a mass of the first mass part provided in the first direction from the first rotation axis. Therefore, torque is generated in a rotary motion system including the first movable body by an external acceleration, and it is possible to detect a physical quantity. A mass of the fourth mass part provided in a direction opposite to the first direction from the second rotation axis is lighter than a mass of the third mass part provided in the first direction from the second rotation axis. Therefore, torque is also generated in the rotary motion system including the second movable body by the external acceleration, and it is possible to detect a physical quantity.

In the embodiment, the physical quantity sensor may include a drive circuit that outputs a first drive signal to the first movable body and outputs a second drive signal having a phase different from that of the first drive signal, and a detection circuit including a differential amplifier circuit in which the first fixed electrode is coupled to a first terminal and the second fixed electrode is coupled to a second terminal.

In this way, different potentials can be applied to the first movable body and the second movable body by the drive circuit. Therefore, by inputting different electrical signals from the first fixed electrode and the second fixed electrode to the differential amplifier circuit, it is possible to electrically detect the physical quantity.

The embodiment relates to an inertial measurement unit including the physical quantity sensor and a controller that performs control based on a detection signal output from the physical quantity sensor.

Although the embodiment has been described in detail as described above, it can be readily apparent to those skilled in the art that many modifications may be made without departing substantially from novel matters and effects of the present disclosure. Accordingly, such modifications are intended to be included in the scope of the present disclosure. For example, a term cited with a different term having a broader meaning or the same meaning at least once in the description or in the drawings can be replaced with a different term at any place in the description or in the drawings. All combinations of the embodiment and the modifications are also included within the scope of the present disclosure. The configurations, operations, and the like of the physical quantity sensor and the inertial measurement unit are not limited to those described in the embodiment, and various modifications can be made.

What is claimed is:

1. A physical quantity sensor comprising:
   when directions orthogonal to one another being defined as a first direction, a second direction, and a third direction,
   a substrate;
   a first fixed electrode and a second fixed electrode provided on a surface of the substrate, each of the first and second fixed electrodes extending along the second direction, the first fixed electrode and the second fixed electrode being spaced apart along the first direction;
   a first movable body provided to be swingable with respect to the substrate about a first rotation axis of a first beam, the first rotation axis extending along the second direction, the first movable body facing the first fixed electrode and the second fixed electrode along the third direction;
   a second movable body provided to be swingable with respect to the substrate about a second rotation axis of a second beam, the second rotation axis extending along the second direction, the second movable body facing the first fixed electrode and the second fixed electrode along the third direction, the first movable body being spaced apart from the second movable body along the second direction via a border; and
   a shield plate provided at the border, the shield plate being directly adjacent to each of the first and second movable bodies, wherein
   the first rotation axis is disposed between the first fixed electrode and the second fixed electrode in a plan view along the third direction,
   the second rotation axis is disposed between the first fixed electrode and the second fixed electrode in the plan view, and
   the shield plate completely overlaps the first and second movable bodies and the first and second beams in a stationary state of the physical quantity sensor when viewed along the second direction.

2. The physical quantity sensor according to claim 1, wherein
   a potential of the shield plate is an intermediate potential between a first potential of the first movable body and a second potential of the second movable body.

3. The physical quantity sensor according to claim 2, wherein
   the potential of the shield plate is the same as a potential of the substrate.

4. The physical quantity sensor according to claim 1, wherein
   the shield plate is a wall provided on the substrate.

5. The physical quantity sensor according to claim 1, wherein
   the shield plate includes:
     a first shield extending along the first direction between the first movable body and the second movable body; and
     a second shield extending from one end side of the first shield and along the first movable body in the second direction.

6. The physical quantity sensor according to claim 5, wherein
   the shield plate includes a third shield extending from the other end side of the first shield and along the second movable body in a direction opposite to the second direction.

7. The physical quantity sensor according to claim 1, further comprising:
   a first anchor fixed to the surface of the substrate, wherein
   the first beam couples the first anchor and the first movable body, and
   the first movable body swings with the first beam as the first rotation axis.

8. The physical quantity sensor according to claim 7, further comprising:
   a second anchor fixed to the surface of the substrate, wherein
   the second beam couples the second anchor and the second movable body, and
   the second movable body swings with the second beam as the second rotation axis.

9. The physical quantity sensor according to claim 1, wherein
   the first movable body includes:
     a first mass part provided in the first direction from the first rotation axis; and
     a second mass part provided in a direction opposite to the first direction from the first rotation axis and heavier than the first mass part, and
   the second movable body includes:

a third mass part provided in the first direction from the second rotation axis; and a fourth mass part provided in a direction opposite to the first direction from the second rotation axis and lighter than the third mass part.

10. The physical quantity sensor according to claim 1, further comprising:

a drive circuit configured to output a first drive signal to the first movable body and output a second drive signal having a phase different from that of the first drive signal to the second movable body; and a detection circuit, wherein the detection circuit includes a differential amplifier circuit including a first terminal and a second terminal, the first terminal is coupled to the first fixed electrode, and the second terminal is coupled to the second fixed electrode.

11. The physical quantity sensor according to claim 10, wherein the first terminal is a non-inverting terminal, and the second terminal is an inverting terminal.

12. An inertial measurement unit comprising:

the physical quantity sensor according to claim 1; and a controller configured to perform control based on a detection signal output from the physical quantity sensor.

* * * * *